US007330009B2

(12) United States Patent
Andoh et al.

(10) Patent No.: US 7,330,009 B2
(45) Date of Patent: Feb. 12, 2008

(54) METHOD, APPARATUS, AND PROGRAM FOR DRIVING A MOTOR IN A FEEDBACK CONTROL SYSTEM, CAPABLE OF SUPPRESSING MOTOR OSCILLATION

(75) Inventors: Toshiyuki Andoh, Kanagawa-ken (JP); Tadashi Shinohara, Kanagawa-ken (JP); Yuuji Matsuda, Tokyo (JP); Kazuhiko Kobayashi, Tokyo (JP); Nobuto Yokokawa, Saitama-ken (JP); Masato Yokoyama, Kanagawa-ken (JP); Yohhei Miura, Chiba-ken (JP); Toshiyuki Takahashi, Kanagawa-ken (JP); Jun Hosokawa, Tokyo (JP)

(73) Assignee: Ricoh Co., Ltd., Tokyo (JP)

( * ) Notice: Subject to any disclaimer, the term of this patent is extended or adjusted under 35 U.S.C. 154(b) by 189 days.

(21) Appl. No.: 10/893,392

(22) Filed: Jul. 19, 2004

(65) Prior Publication Data
US 2005/0057209 A1  Mar. 17, 2005

(30) Foreign Application Priority Data
Jul. 18, 2003 (JP) ............................. 2003-199340
Jul. 31, 2003 (JP) ............................. 2003-204287
Mar. 18, 2004 (JP) ............................. 2004-079288

(51) Int. Cl.
*H02P 8/00* (2006.01)

(52) U.S. Cl. .................... 318/696; 318/685; 318/618; 318/671

(58) Field of Classification Search ................ None
See application file for complete search history.

(56) References Cited
U.S. PATENT DOCUMENTS 4,469,995 A * 9/1984 Chiang et al. ............. 318/685
4,707,650 A * 11/1987 Bose ....................... 318/685
4,857,817 A    8/1989 Kugioka
5,036,266 A * 7/1991 Burke ...................... 318/646
5,062,006 A   10/1991 Miura
5,134,349 A * 7/1992 Kruse ...................... 318/254
5,592,261 A    1/1997 Yoshino
5,825,151 A * 10/1998 Ikawa et al. ............. 318/685
5,911,125 A * 6/1999 Fujibayashi et al. ....... 702/141
6,040,676 A * 3/2000 Nordquist et al. ......... 318/696
6,167,221 A   12/2000 Kobayashi
6,281,650 B1 * 8/2001 Yutkowitz ................. 318/561
6,295,435 B1  9/2001 Shinohara et al.

(Continued)

FOREIGN PATENT DOCUMENTS
EP        0 420 427 A2   4/1991

(Continued)

OTHER PUBLICATIONS
U.S. Appl. No. 11/420,929, filed May 30, 2006, Matsuda.

*Primary Examiner*—Lincoln Donovan
*Assistant Examiner*—Renata McCloud
(74) *Attorney, Agent, or Firm*—Oblon, Spivak, McClelland, Maier & Neustadt, P.C.

(57) ABSTRACT

A method, apparatus, and program for driving a motor in a feedback control system, capable of suppressing oscillation of the motor rotational speed are disclosed. A motor drive controller includes a drive motor, a detector, and a motor drive controller. The drive motor drives a moving body around a target speed. The detector detects a current moving speed of the moving body and outputs it as a detector pulse signal. The controller calculates a difference between the current moving speed and the target moving speed, calculates a control value based on the difference, calculates a pulse rate of a drive pulse signal based on the control value after having controlled the control value to be within a predetermined value, and controls the drive motor based on the pulse rate.

6 Claims, 25 Drawing Sheets

U.S. PATENT DOCUMENTS

| | | |
|---|---|---|
| 6,295,438 B1 | 9/2001 | Fujishiro et al. |
| 6,380,960 B1 | 4/2002 | Shinohara |
| 6,381,435 B2 | 4/2002 | Shinohara et al. |
| 6,418,274 B2 * | 7/2002 | Tanaka ........................ 388/800 |
| 6,573,918 B2 | 6/2003 | Kobayashi et al. |
| 6,587,137 B2 | 7/2003 | Shinohara et al. |
| 6,593,951 B2 | 7/2003 | Yokoyama et al. |
| 6,690,896 B2 | 2/2004 | Hanada et al. |
| 6,693,654 B2 | 2/2004 | Shinohara |
| 6,704,035 B2 | 3/2004 | Kobayashi et al. |
| 6,708,017 B2 | 3/2004 | Yamanaka et al. |
| 6,711,364 B2 | 3/2004 | Shinohara |
| 6,714,224 B2 | 3/2004 | Yamanaka et al. |
| 6,719,396 B2 * | 4/2004 | Anzai ........................... 347/19 |
| 2002/0136570 A1 | 9/2002 | Yamanaka et al. |
| 2002/0163266 A1 | 11/2002 | Tsujimoto et al. |
| 2003/0137577 A1 | 7/2003 | Shinohara |
| 2003/0223784 A1 | 12/2003 | Yamanaka et al. |
| 2004/0009019 A1 | 1/2004 | Hosokawa |
| 2005/0057209 A1 | 3/2005 | Andoh et al. |

FOREIGN PATENT DOCUMENTS

| | | |
|---|---|---|
| EP | 0 523 252 A1 | 1/1993 |
| JP | 8-137362 | 5/1996 |
| JP | 10-23798 | 1/1998 |
| JP | 10-271895 | 10/1998 |
| JP | 11-89293 | 3/1999 |
| JP | 2000-108406 | 4/2000 |
| JP | 2001-66909 | 3/2001 |

\* cited by examiner

FIG. 11

| COEFFICIENT | VALUE |
|---|---|
| a11= | 8173 |
| a21= | -2225 |
| b01= | 133 |
| b11= | 266 |
| b21= | 133 |
| a12= | 10389 |
| a22= | -5050 |
| b02= | 11022 |
| b12= | 22045 |
| b22= | 11022 |

| | |
|---|---|
| ISF | 2240 |
| QFORMAT | 13 |

METHOD, APPARATUS, AND PROGRAM FOR DRIVING A MOTOR IN A FEEDBACK CONTROL SYSTEM, CAPABLE OF SUPPRESSING MOTOR OSCILLATION

CROSS-REFERENCE TO RELATED APPLICATIONS

This patent specification is based on Japanese patent application Nos. JPAP2003-199340 filed on Jul. 18, 2003, JPAP2003-204287 filed on Jul. 31, 2003, and JPAP2004-079288 filed on Mar. 18, 2004, in the Japanese Patent Office, the entire contents of which are incorporated by reference herein.

BACKGROUND OF THE INVENTION

1. Field of the Invention

The present invention relates to a method, apparatus, and program for driving a motor, and more particularly to a method, apparatus, and program for driving a motor with a feedback control system.

2. Discussion of the Background

Stepping motors are widely used in diverse applications requiring accurate positioning or drive control, such as image forming apparatuses, cameras, automobiles, etc. With the stepping motor, positioning or driving of an object can be easily and accurately controlled by using a feedback control system.

For example, such a feedback control system generally includes a stepping motor, an object to be controlled, a detector, and a controller. The stepping motor drives the object. The detector detects the speed of the object. To control the object to have a desired speed, the controller calculates a control value, based on the difference between the detected speed and the desired speed of the object, generates a drive current or voltage based on the control value, and applies the drive current or voltage to the stepping motor. With this drive current or voltage, the stepping motor makes a stepwise rotation so as to drive the object at the desired speed.

One drawback of this feedback control system is that the stepping motor tends to oscillate when a large control value is generated, since it instantaneously changes a drive current or voltage. To solve this problem, microstep drive is generally applied, which divides one full-step into a number of smaller steps, called microsteps. More specifically, a drive current or voltage of a sinusoidal waveform is divided into a number of stepped currents or voltages having different levels, and the stepped drive currents or voltages are fed to the respective windings with phase differences between them.

Currently, two types of microstep drives are generally used, including a 2W1-2 phase excitation drive mode that divides one full step into 8 microsteps and a 4W1-2 phase excitation drive mode that divides one full step into 16 microsteps. With this technique, the stepping motor tends to rotate more smoothly. However, oscillation is still observed in some cases.

In one example, oscillation is observed when more than two different excitation modes are used in one feedback control system. For example, a feedback control system is provided, which drives a stepping motor in two different excitation modes, including 2W1-2 and 4W1-2 phase excitation drive modes. In such a system, a higher control value is generated in the 2W1-2 mode than a control value in the 4W1-2 mode. In other words, the stepping motor, operating in the 2W1-2 mode, becomes too sensitive to the change in speed, and tends to generate oscillation rather than to suppress it.

SUMMARY OF THE INVENTION

In view of the foregoing, it is an object of the present invention to provide a method, apparatus, and program for driving a drive motor with a feedback control system, capable of suppressing oscillation of the drive motor.

Such a feedback control system generally includes a drive motor, a detector, and a controller. The drive motor is directly or indirectly connected to a moving body and drives the moving body around a target moving speed.

The drive motor is preferably implemented as a stepping motor, which can be driven by a microstep excitation drive method, for example.

The detector is directly or indirectly connected to the moving body, and detects a current moving speed of the moving body and outputs it as a detector pulse signal. The detector is preferably implemented as an encoder, however, it may be implemented as a scale or a toner mark provided on a surface of the moving body.

The controller is electrically connected to the drive motor and to the detector, receives the detector pulse signal, calculates the difference between the current moving speed and the target moving speed, calculates a control value based on the difference, calculates a pulse rate of a drive pulse signal based on the control value after having controlled the control value to be within a predetermined value range, and controls the drive motor by adapting the pulse rate.

In one example, the controller may include a first calculator, a filter component, a gain component, and a second calculator.

The first calculator calculates a rotational speed error, which corresponds to the difference between the target rotational speed and the current rotational speed. The first calculator receives this information by a detector pulse signal. The filter component generates a controlled rotational speed error by removing a high frequency component of the rotational speed error. To remove the high frequency component, any type of low-pass filter is used, depending on the characteristics of the high frequency component. The gain component generates the control value by multiplying the controlled rotational speed error with a gain coefficient. More specifically, the control value is calculated using such as proportional gain, integral gain or differential gain. The second calculator calculates the pulse rate by adding the control value to a predetermined standard pulse rate. This process is performed by the controller, according to a program previously stored in a first memory of the controller. The calculator is additionally provided with a second memory, which stores various kinds of variables, such as the rotational speed error, the controlled rotational speed error, the control value, a positional deviation and/or the pulse rate.

The controller may additionally include a detection interface, a drive interface, and a motor driver. The detection interface converts the detector pulse signal from an analog to a digital value. The drive interface generates the drive pulse signal based on the pulse rate. The motor driver generates a drive current or voltage based on the drive pulse signal, and applies the drive current or voltage to the drive motor.

Alternatively, the controller may have a structure other than this exemplary structure, depending on a calculating process of the pulse rate, as long as the control value is controlled within the predetermined value range.

A method for controlling the control value also varies, depending on the system in use.

In one example, the controller increases the gain coefficient proportionally to the number of microsteps, which is defined according to the microstep excitation drive method.

In another example, the controller generates a comparison control value, compares the comparison control value with a reference control value, and controls the control value to be within the predetermined value range based on the comparison result.

In such a case, a third memory is additionally provided, which stores therein the reference control value. The reference control value corresponds to a maximum control value that can be applied to the drive motor, without causing oscillation of the drive motor. The reference control value is used to determine an upper reference control value and a lower reference control value.

The comparison control value may be calculated as a difference between a control value calculated at a current sampling period and a control value calculated at a previous sampling period. Alternatively, the comparison control value may be calculated as a difference between a pulse rate calculated at a current sampling period and a pulse rate calculated at a previous sampling period.

In one example of controlling a control value using the comparison control value, the controller sets the control value to a current control value that is calculated at the current sampling period when the comparison control value is equal to the upper reference control value or to the lower reference control value, or is between the upper reference control value and the lower reference control value. In other cases, the controller sets the control value to the upper reference control value when the comparison control value is larger than the upper reference control value, or sets the control value to the lower reference control value when the comparison control value is smaller than the lower reference control value.

As illustrated in the following description, an exemplary embodiment of the present invention can be implemented in a sheet transfer device of an image forming apparatus. However, it is to be noted that the present invention can be applied in many other ways, as will be apparent to those skilled in the art, including a carriage of an image forming apparatus, an auto-focusing or zooming device of a camera, a throttle mechanism in an automobile cruise control system, etc.

Further, an exemplary embodiment of the present invention may be applied in various forms, such as an apparatus, method, system, software program, or recording medium, as will be apparent to those skilled in the art.

BRIEF DESCRIPTION OF THE DRAWINGS

A more complete appreciation of the disclosure and many of the related advantages thereof will be readily obtained as the same becomes better understood by reference to the following detailed description when considered in connection with the accompanying drawings, wherein:

FIG. 11 is a table providing an exemplary list of coefficient values used by the filter component of FIG. 10;

DETAILED DESCRIPTION OF PREFERRED EMBODIMENTS

Figure 1:
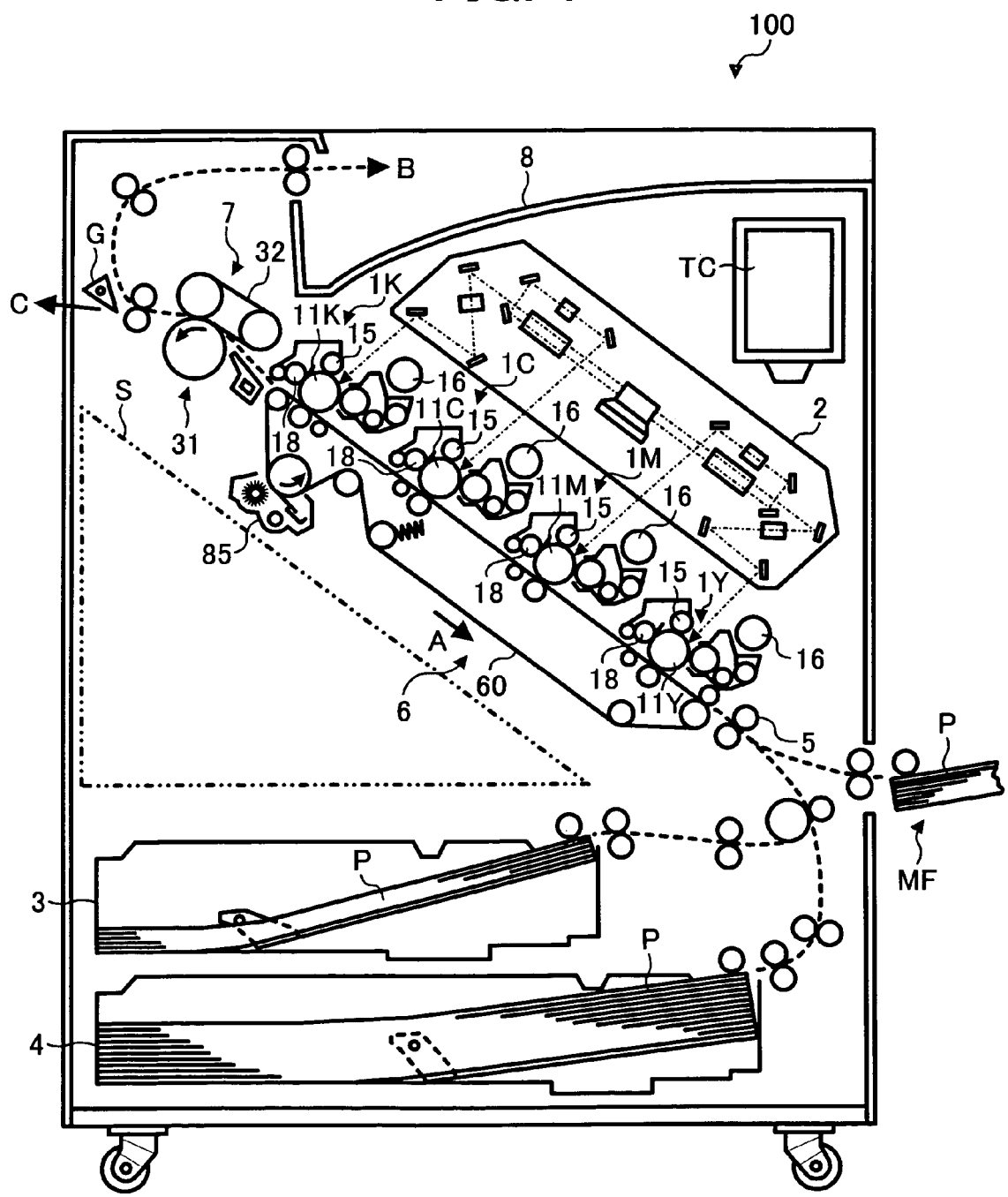
FIG. 1 is a cross-sectional diagram illustrating an image forming apparatus according to a preferred embodiment of the present invention.

In describing preferred embodiments illustrated in the drawings, specific terms or details are set forth for the sake of clarity. However, the disclosure of this patent specification is not intended to be limited to such specific terms or details selected and it is to be understood that each specific element includes all equivalents that operate in a similar manner. Referring now to the drawings, wherein like reference numerals designate identical or corresponding parts throughout the several views, particularly to FIG. 1, a description is provided for an image forming apparatus 100, having an exemplary embodiment of the present invention incorporated therein.

The image forming apparatus 100 is preferably a tandem-type image forming apparatus, such as a color laser printer, which sequentially transfers color images on a transfer belt to form a full-color toner image. In such an image forming apparatus of tandem type, alignment of the respective colors is important. However, a color displacement is often caused due to speed fluctuations of the transfer belt, for example. To prevent speed fluctuations, an exemplary embodiment of the present invention is implemented.

First, a general structure and operation of the image forming apparatus 100 of FIG. 1 are described. The image forming apparatus 100 mainly includes image forming devices 1Y, 1M, 1C and 1K, an optical writing device 2, sheet feed cassettes 3 and 4, a registration roller pair 5, the sheet transfer device 6, a fixing device 7, a sheet discharge tray 8, and cleaning devices 18 and 85.

The image forming apparatus 100 further includes a toner container TC, a manual feed tray MF, an operational panel (not shown), and a display (not shown). Furthermore, a disposed toner bottle (not shown), a duplex/reverse device (not shown), and a power supply device (not shown), for example, are provided in a space S.

The image forming devices 1Y, 1M, 1C and 1K for respective colors of yellow, magenta, cyan and black (hereinafter, Y, M, C and K correspond to yellow, magenta, cyan, and black, respectively) are arranged side by side along a transfer belt 60, which rotates in a direction indicated by an arrow A. The image forming devices 1Y, 1M, 1C and 1K respectively include photoconductors 11Y, 11M, 11C and 11K, chargers 15, developers 16, and dischargers. The developers 16 charge the respective surfaces of the photoconductors 11Y to 11K for image formation. The developers 16 form toner images of respective colors with toner of respective colors.

The optical writing device 2 emits four lines of laser beams according to image data of respective colors from a light source (not shown). The emitted laser beams are deflected by polygon mirrors, passes f-theta lenses and reflective mirrors, and exposes the surfaces of the respective photoconductors 11Y, 11M, 11C and 11K. As a result, electrostatic latent images of colors Y, M, C and K are formed on the respective photoconductors 11Y, 11M, 11C and 11K.

The sheet feed cassettes 3 and 4 each hold a stack of recording sheets P. The recording sheet P is fed from the sheet feed cassettes 3, 4, or the manual feed tray MF, to the registration roller pair 5 for image formation. The registration roller pair 5 sends the recording sheet P to the sheet transfer device 6 at a predetermined timing.

The sheet transfer device 6 is provided with the transfer belt 60, which is supported by a plurality of rollers, such that it closely contacts the photoconductors 11Y, 11M, 11C and 11K. The transfer belt 60 transfers the recording sheet P to the respective image forming devices 1Y to 1K, and to the fixing device 7. In the respective image forming devices 1Y to 1K, the toner images of the respective colors are sequentially transferred to the recording sheet P. As a result, a full-color toner image is formed on the recording sheet P.

The fixing device 7 includes a pressure roller pair 31 and a fixing belt 32, which apply heat and pressure to the recording sheet P passing through a nip between them. With the heat and pressure, the full-color toner image is fixed to the recording sheet P.

The recording sheet P is then transferred to the sheet discharge tray 8 in a direction indicated by a dashed-line arrow B, or to a direction indicated by a solid-line arrow C, depending on a direction determined by a switching guide G When the recording sheet P is discharged onto the sheet discharge tray 8, the recording sheet P has the full-color image facing down. On the other hand, the recording sheet P in the arrow C direction is further transferred to another device, such as a sorter (not shown) or a stapler (not shown), or transferred back to the registration roller 5 for duplex printing.

The cleaning device 85, including a brush and a blade, removes residual toner adhered to the transfer belt 60. Further, the cleaning devices 18 clean the respective surfaces of the photoconductors 11Y to 11K to remove residual toner. The dischargers then discharge the respective surfaces of the photoconductors 11Y to 11K to prepare for next image formation.

In addition to the above general operation of forming a full-color toner image, the image forming apparatus 100 is capable of forming a black toner image. In such a case, the transfer belt 60 is separated from the photoconductors 11Y, 11M and 11C.

Figure 2:
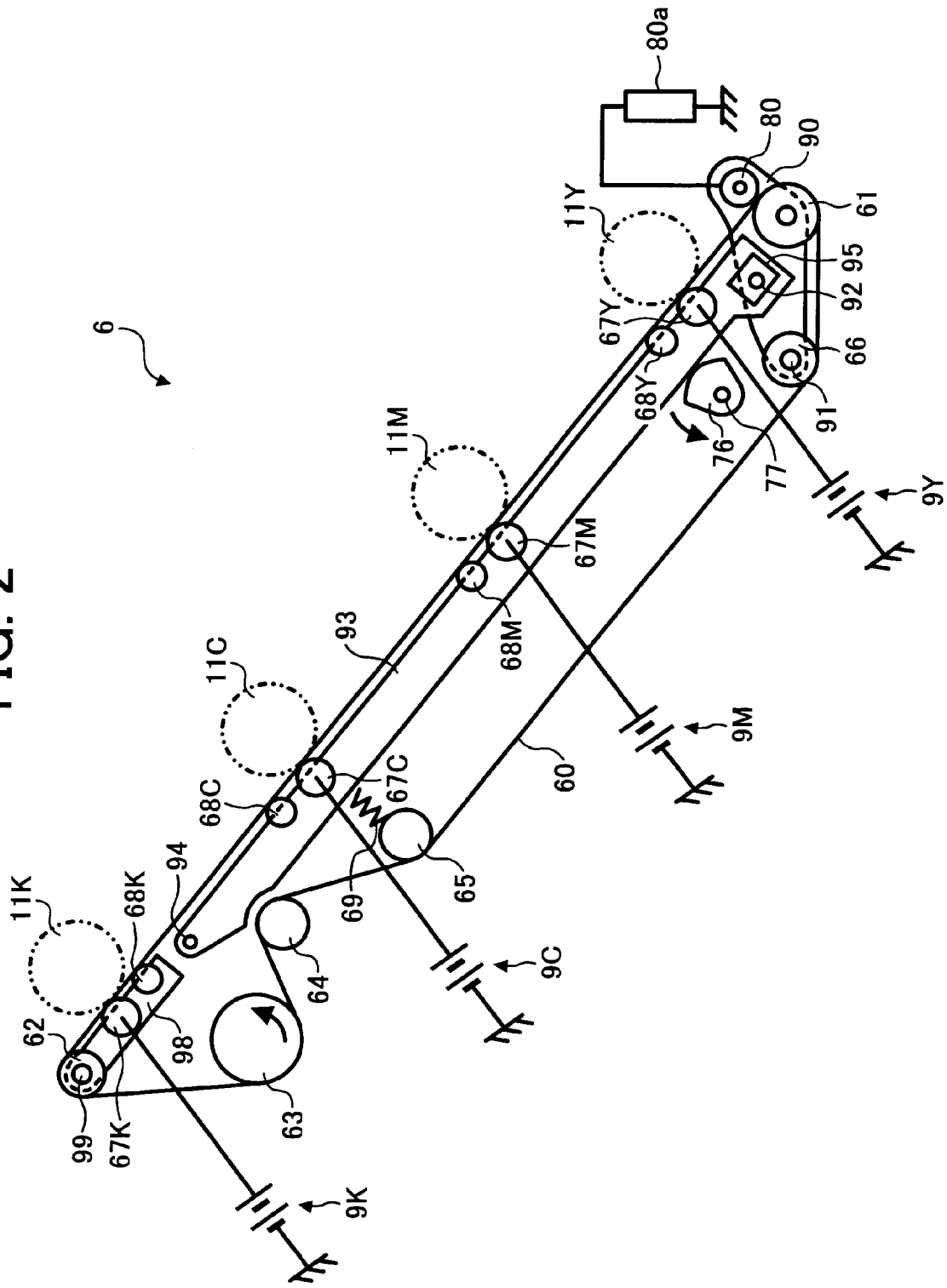
FIG. 2 is a schematic diagram of a sheet transfer device of the image forming apparatus of FIG. 1.

Next, the sheet transfer device 6, which implements an exemplary embodiment of the present invention, is described referring to FIG. 2.

The transfer belt 60 includes an endless single-layer belt preferably made of PVDF (Polyvinylidene Fluoride), having a high resistance of $10^9$ to $10^{11}$ $\Omega$cm. As shown in FIG. 2, the transfer belt 60 is passed over a plurality of rollers, including an inlet roller 61, an outlet roller 62, a drive roller 63, a pressure roller 64, a tension roller 65, a right roller 66, bias rollers 67Y to 67K, and backup rollers 68Y to 68K.

The inlet roller 61, located most upstream, closely contacts an absorption roller 80, via the transfer belt 60. The absorption roller 80 is provided with electrical power supplied from a power supply 80a, and applies an electrostatic charge to the recording sheet P being transferred through a nip formed between the absorption roller 80 and the inlet roller 61. The charged recording sheet P, which has been electrostatically coupled to the transfer belt 60, is carried by the transfer belt 60 to receive the electrostatic latent images formed on the respective photoconductors 11Y to 11K.

The drive roller 63, which is driven by a drive motor (not shown), rotates in the direction indicated by an arrow. With this rotation, the drive roller 63 frictionally drives the transfer belt 60.

The bias rollers 67Y, 67M, 67C, and 67K receive transfer biases, respectively, from power supplies 9Y, 9M, 9C, and 9K, and transmits them to the transfer belt 60. As a result, an electrical field of a predetermined strength is generated between the transfer belt 60 and the respective photoconductors 11Y to 11K.

The backup rollers 68Y to 68K are provided so as to keep suitable nips between the recording sheet P and the respective photoconductors 11Y to 11K.

The bias rollers 67Y to 67C and the backup rollers 68Y to 68K are incorporated in a swinging bracket 93. The swinging bracket 93 rotates, in a clockwise direction, around a rotary shaft 94, as a cam 76 fixed to a cam shaft 77 rotates in the direction indicated by an arrow.

The inlet roller 61 and the absorption roller 80 are incorporated in an inlet bracket 90. The inlet bracket 90 rotates, in a clockwise direction, around a rotary shaft 91, as the swinging bracket 93 rotates. As shown in FIG. 2, the swinging bracket 93 is connected, through a hole 95, onto the inlet bracket 90 with a pin 92. Therefore, the swinging bracket 93 and the inlet bracket 90 are operatively associated. With the clockwise rotations of the swinging bracket 93 and the inlet bracket 90, the bias rollers 67Y to 67C and the backup rollers 68Y to 68C are separated from the photoconductors 11Y, 11M, and 11C, respectively. This causes the inlet roller 61 and the absorption roller 80 to move downward. With this configuration, a black image can be effectively formed, while separating the photoconductors 11Y, 11M, and 11C from the transfer belt 60.

The bias roller 67K and the backup roller 68K are incorporated in an outlet bracket 98. The outlet bracket 98 rotates, in a clockwise direction, around a rotary shaft 99 through operation of a handle (not shown). With this rotation, the bias roller 67K and the backup roller 68K are separated from the photoconductor 11K, such that the sheet transfer device 6 may be easily removed from the image forming apparatus 100 to receive maintenance, for example.

The pressure roller 64 is provided downstream of the drive roller 63 in a manner such that the transfer belt 60 is partially wound around the drive roller 63. This increases a frictional force of the drive roller 63 with respect to the transfer belt 60.

The tension roller 65, including a pressing member 69 such as a spring, applies a tensional force to the transfer belt 60.

Figure 3:
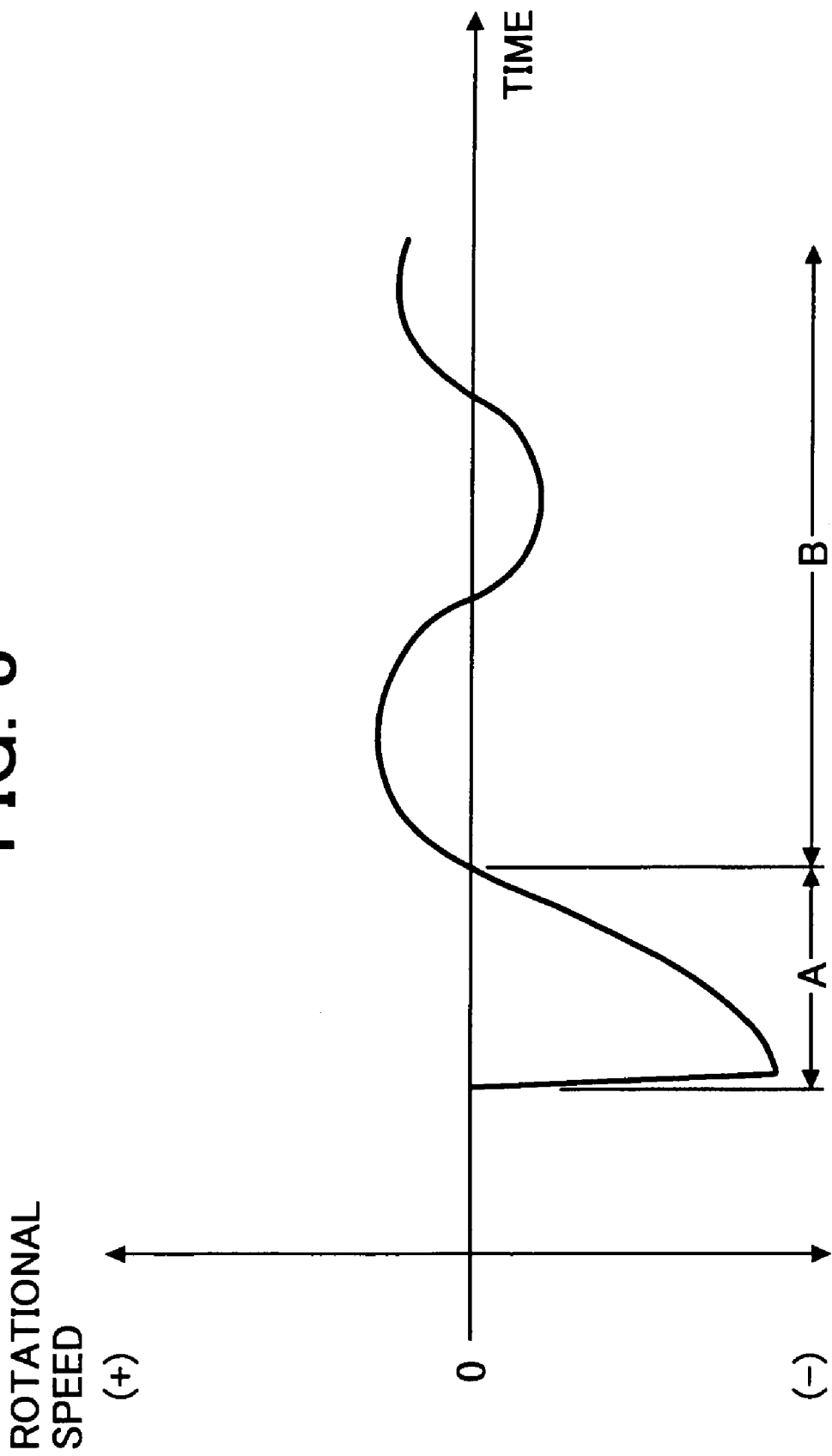
FIG. 3 is a graph showing the relationship between time and a rotational speed of a transfer belt in a background image forming apparatus.

The above-described rollers 61 to 68 should ideally rotate in same speeds, as they all support the transfer belt 60. In reality, however, the rollers 61 to 68 rotate in speeds slightly different from each other due to the differences in rotary shaft diameter. Therefore, the rotational speed of the transfer belt 60 largely fluctuates around its target rotational speed 0, as illustrated in FIG. 3. As a result, color displacement occurs in a subscanning direction.

Figure 4:
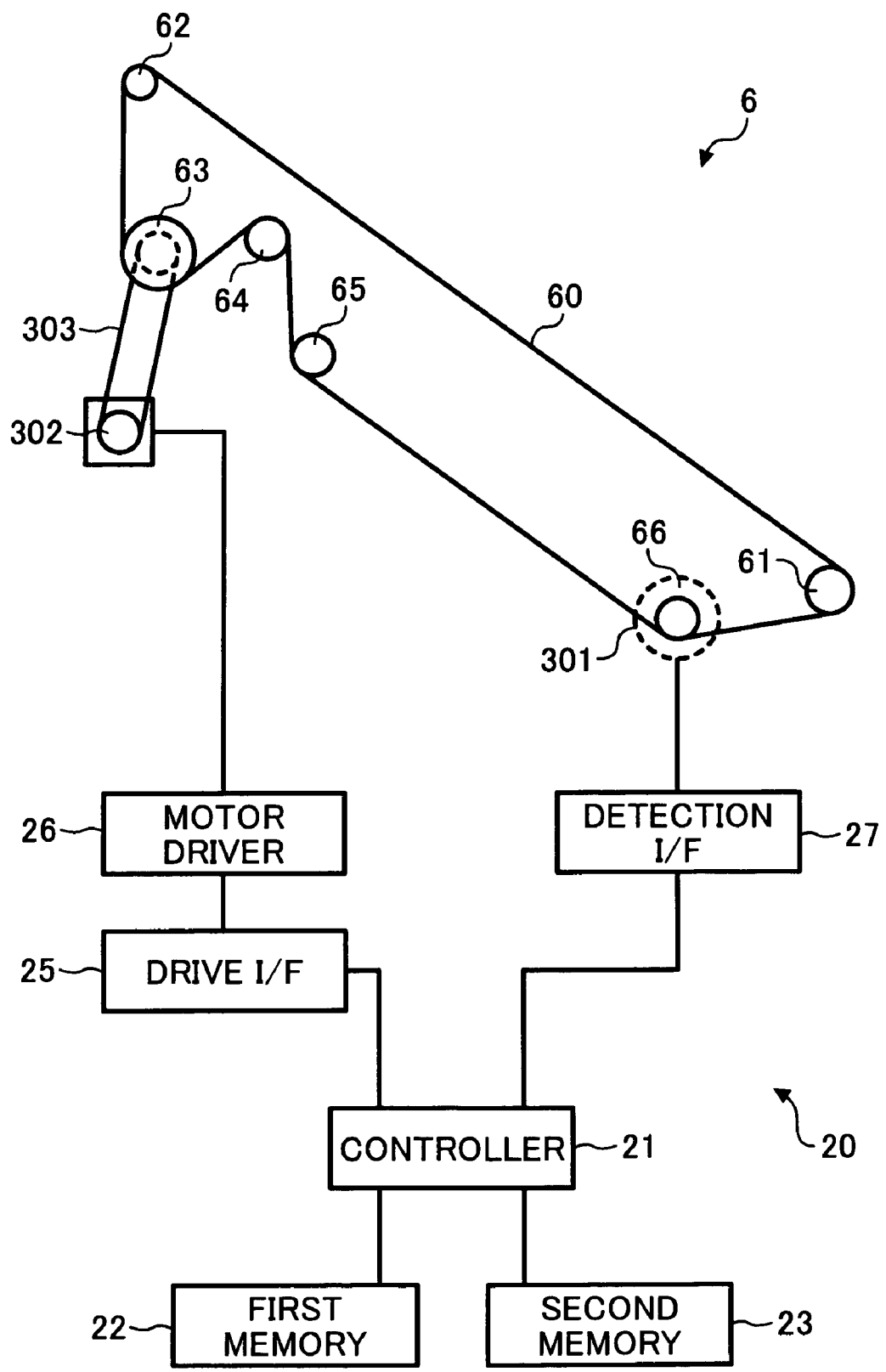
FIG. 4 is a block diagram illustrating an exemplary structure of a motor drive controller according to a preferred embodiment of the present invention.

To prevent color displacement, a motor drive controller 20 according to a preferred embodiment of the present invention is implemented, as shown in FIG. 4.

The motor drive controller 20 includes a processor 21, a first memory 22, a second memory 23, a drive interface 25, a motor driver 26, a detection interface 27, a drive motor 302, and an encoder 301. The motor drive controller 20 controls the rotational speed of the transfer belt 60 by using feedback control.

Figure 5:
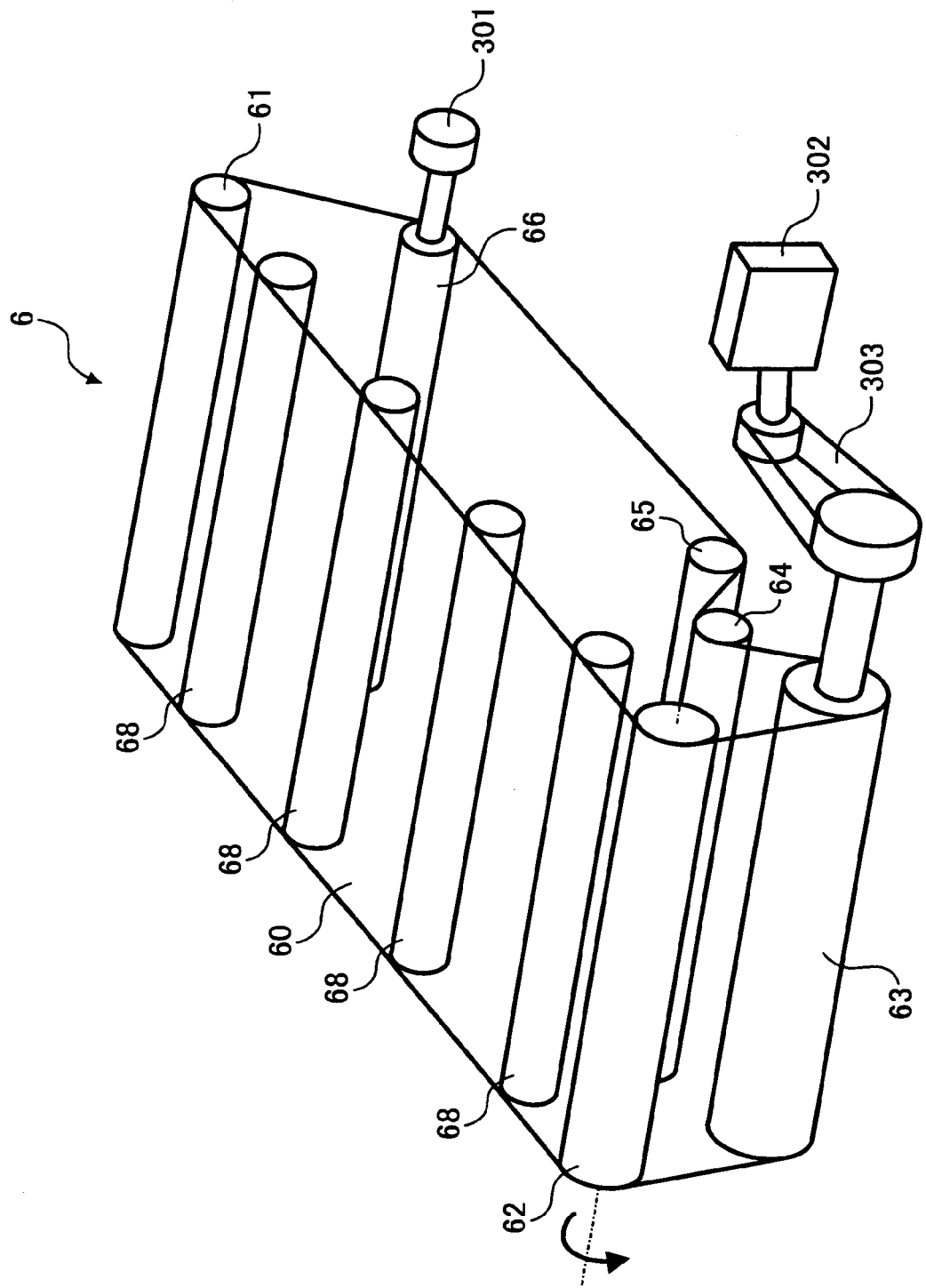
FIG. 5 is a perspective view illustrating the sheet transfer device and the motor drive controller, shown in FIG. 4.

As shown in FIG. 5, the drive motor 302 is operatively associated with the drive roller 63 via a timing belt 303. Thus, the transfer belt 60 is driven by the drive motor 302, according to a drive current or voltage applied by the motor driver 26. In this example, the drive motor 302 is preferably implemented as a stepping motor, while the motor driver 26 is preferably implemented as a semiconductor device of any type, such as a MOSFET (Metal Oxide Semiconductor Field Effect Transistor).

The encoder 301 detects the rotational speed of the transfer belt 60 via the right roller 66, and outputs it to the detection interface 27 as a pulse signal (hereinafter, referred to as an "encoder pulse signal"). In this example, the encoder 301 is connected to the right roller 66, however, the encoder 301 may be connected to any of the rollers 61 to 68, as long as the rotational speed of the transfer belt 60 can be detected. Further, the encoder 301 may be replaced by other type of detector, such as a scale or a toner mark provided on a surface of the transfer belt 60. In other words, instead of measuring the rotational speed of the rollers, it is also possible to measure the linear translation speed of the belt 60. In this case, the encoder 301 can be replaced by another type of encoder for detecting the linear translation speed of the belt. The transfer belt 60 can therefore be marked with encoding markers on the surface or can be perforated with small slits or holes. Instead of controlling the rotational speed error of the rollers, the positional deviation of the transfer belt 60 can be controlled.

Figure 6:
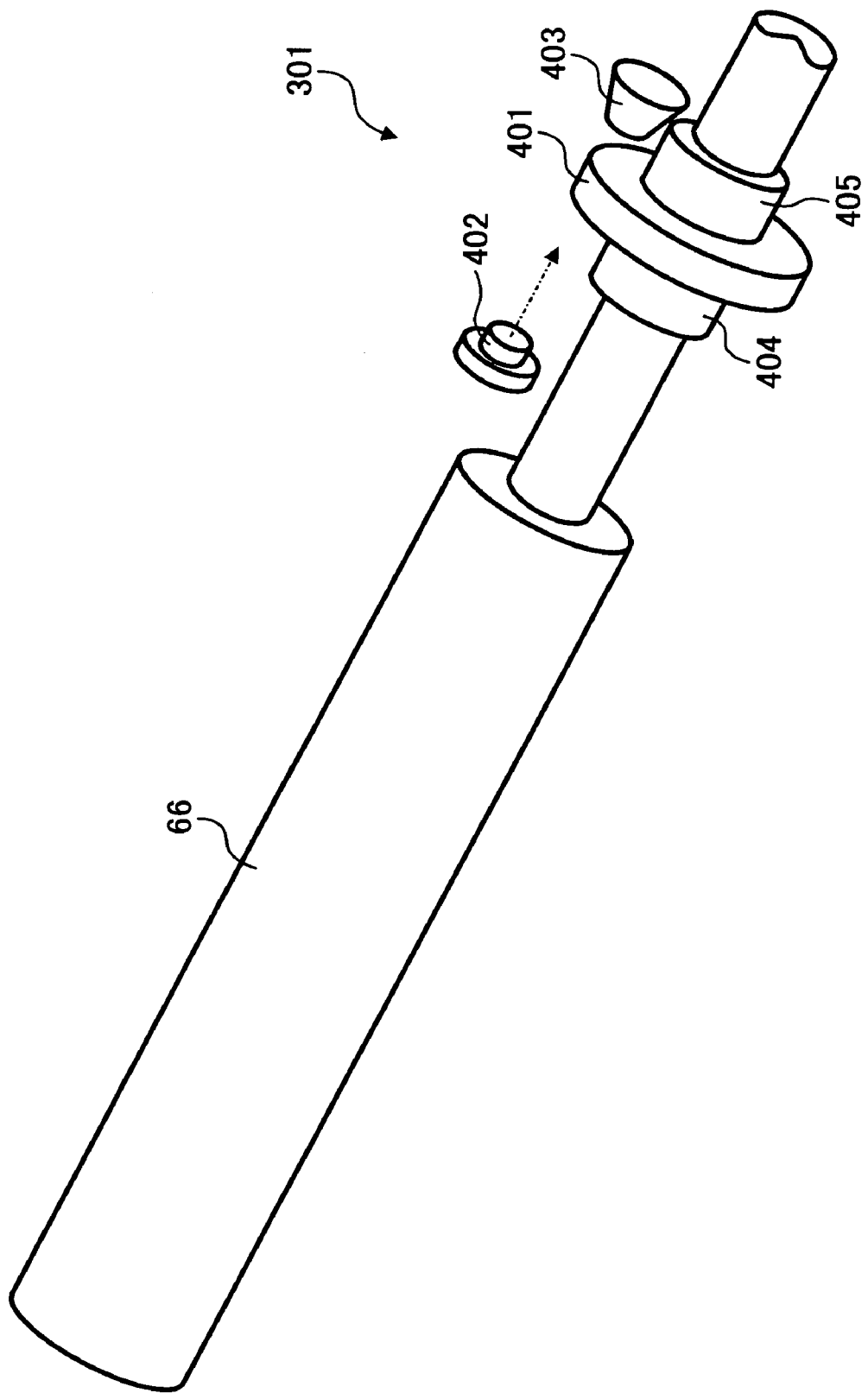
FIG. 6 is an exemplary structure of an encoder shown in FIG. 5.

FIG. 6 shows an exemplary structure of the encoder 301. The encoder 301 includes a disk 401, a light emitting device 402, a light receiving device 403, and pressure bushes 404 and 405.

The pressure bushes 404 and 405 surround the axis of the right roller 66 so as to tightly fix the disk 401 onto the axis, and cause the disk 401 to rotate with the rotation of the right roller 66. The disk 401 has a plurality of slits arranged along its circumferential direction in a predetermined space interval. The slits are capable of transmitting light from the light-emitting device 402 to the light-receiving device 403, in order to achieve high-resolution encoding, e.g. with a resolution of several hundreds encoding steps per revolution. The light-emitting device 402 is provided in a direction extending from one end of the disk 401, and the light-receiving device 403 is provided in a direction extending from the other end of the disk 401. With this structure, the disk 401 generates the encoder pulse signal, i.e., on/off pulse signal, according to the rotation of the right roller 66. In other words, the encoder 301 outputs the encoder pulse signal corresponding to the positional displacement of the right roller 66, which is related proportionally to the rotational speed of the transfer belt 60.

Referring back to FIG. 4, the detection interface 27 converts the encoder pulse signal from analog to digital, and stores it in the second memory 23 via a bus (not shown). The second memory 23 includes a RAM (Random Access Memory), however, any kind of volatile memory may be used. The second memory 23 serves as a work memory of the processor 21, for example.

The processor 21 includes a microprocessor or a CPU (Central Process Unit), capable of controlling the motor drive controller 20 by using a program stored in the first memory 22. The first memory 22 includes a RAM (Read Only Memory), however, any kind of non-volatile memory, including such as PROM (Programmable Read Only Memory), may be used. The processor 21 calculates a pulse rate of a drive pulse signal, based on the encoder pulse signal read out from the second memory 23, and stores it in the second memory 23.

The drive interface 25 generates the drive pulse signal based on the pulse rate read out from the second memory 23, and applies it to the motor driver 26. The motor driver 26 generates a drive current or voltage based on the drive pulse signal, and applies it to the drive motor 302. The drive motor 302 then makes one stepwise rotation. This process of feedback control is repeated until the rotational speed of the transfer belt 60 reaches a target rotational speed, at least in a time period A shown in FIG. 3, and further repeated in a time period B show in FIG. 3 to continuously keep the rotational speed of the transfer belt 60 around the target rotational speed 0.

Figure 7:
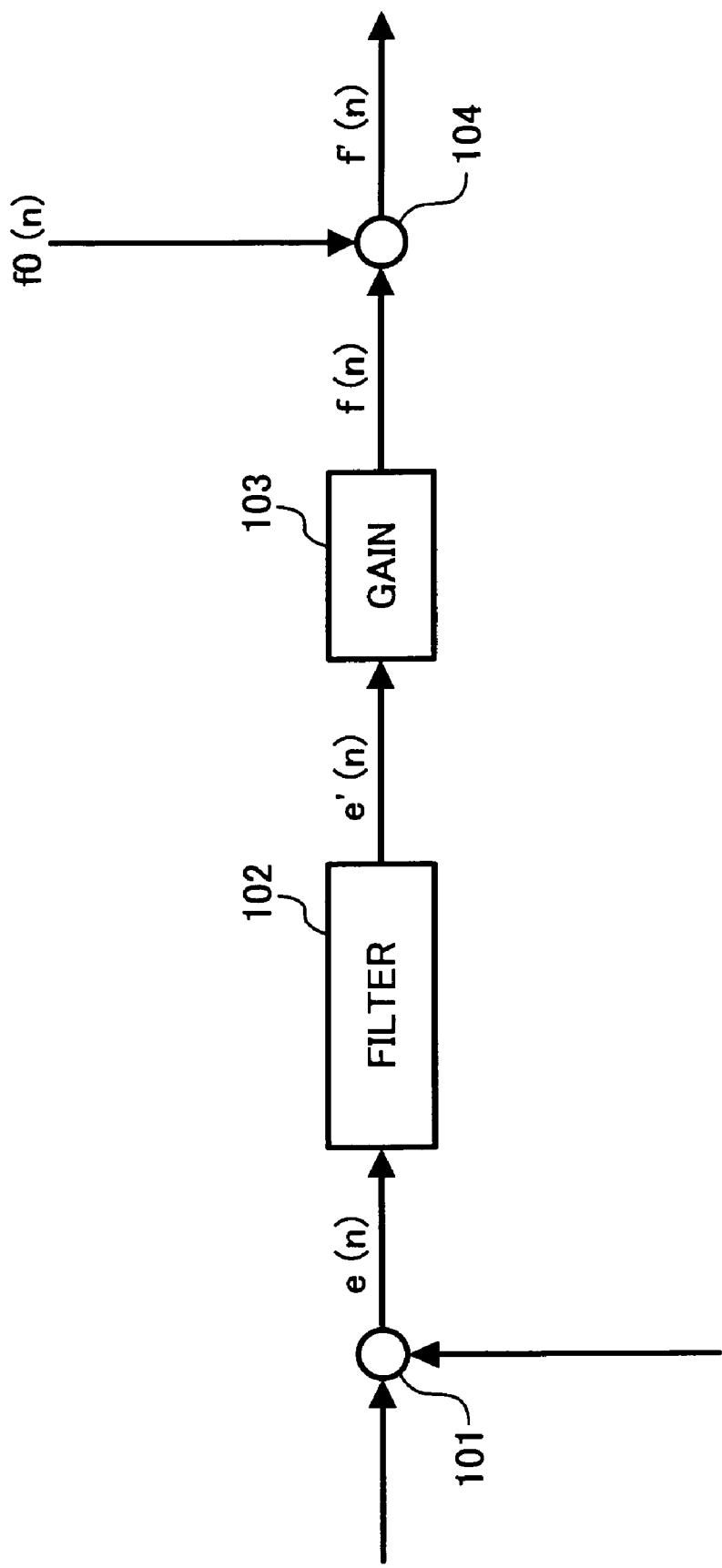
FIG. 7 is a logical diagram illustrating an exemplary calculation process performed by the motor drive controller of FIG. 4.

FIG. 7 is a logical diagram illustrating an exemplary calculation process performed by the processor 21. The processor 21 includes a first calculator 101, a filter component 102, a gain component 103, and a second calculator 104.

The first calculator 101 calculates a rotational speed error e(n), which corresponds to the difference between a detected rotational speed and a target rotational speed of the transfer belt 60. If the linear translation speed of the transfer belt 60 is measured, the first calculator 101 would calculate a positional deviation e(n) of the transfer belt 60, corresponding to the difference between a detected linear translation speed and target linear translation speed. The filter component 102 performs filtering on the calculated rotational speed error e(n), and output it as a controlled rotational speed error e'(n). The gain component 103 calculates a control value f(n) based on the controlled rotational speed error e'(n), and outputs it to the second calculator 104. The second calculator 104 calculates a pulse rate f'(n) using the control value f(n) and a standard pulse rate f0(n), and outputs it to the drive interface 25.

Figure 8:
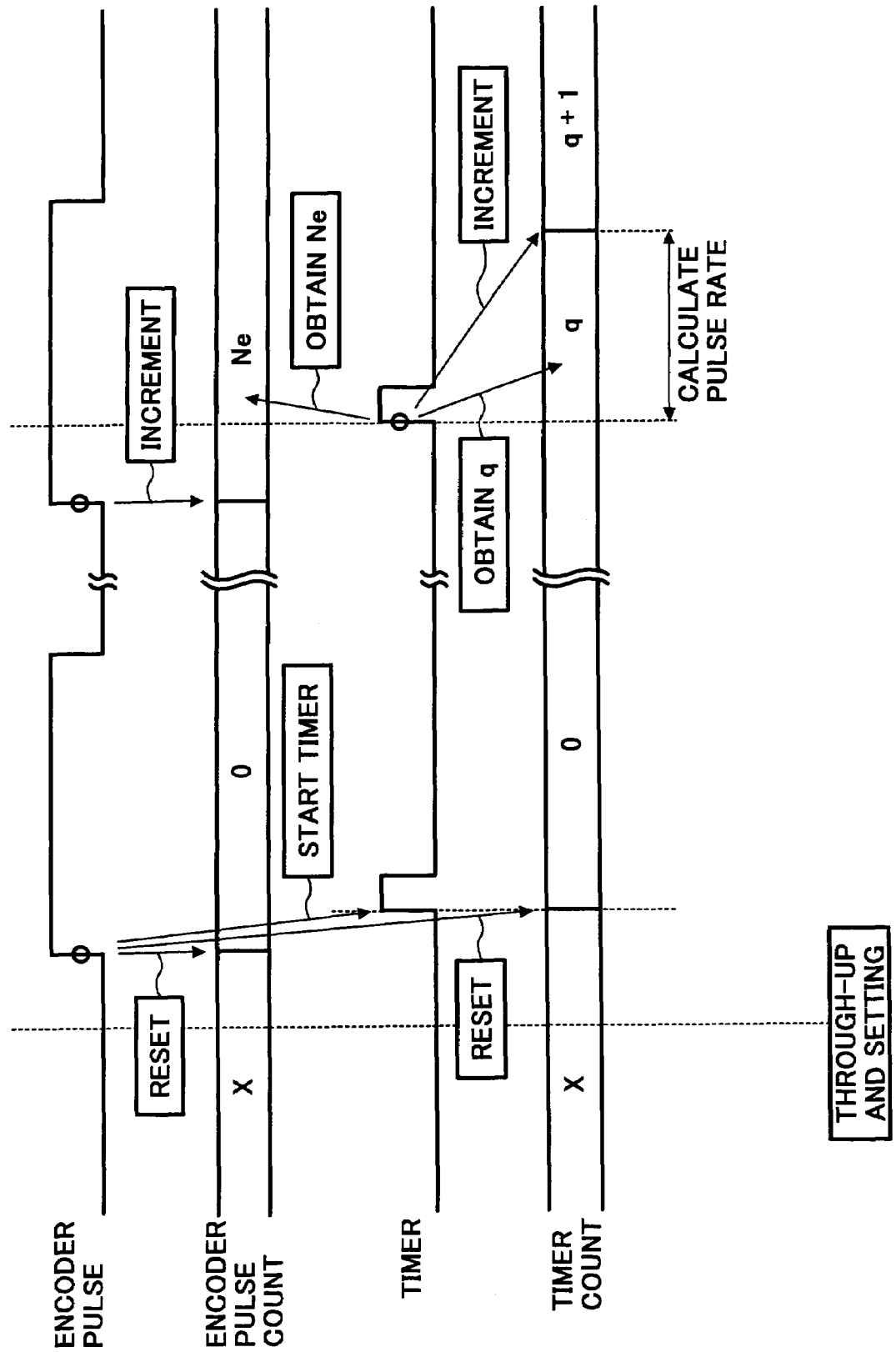
FIG. 8 is a timing chart illustrating an exemplary operation of the motor drive controller of FIG. 4.
Figure 9A:
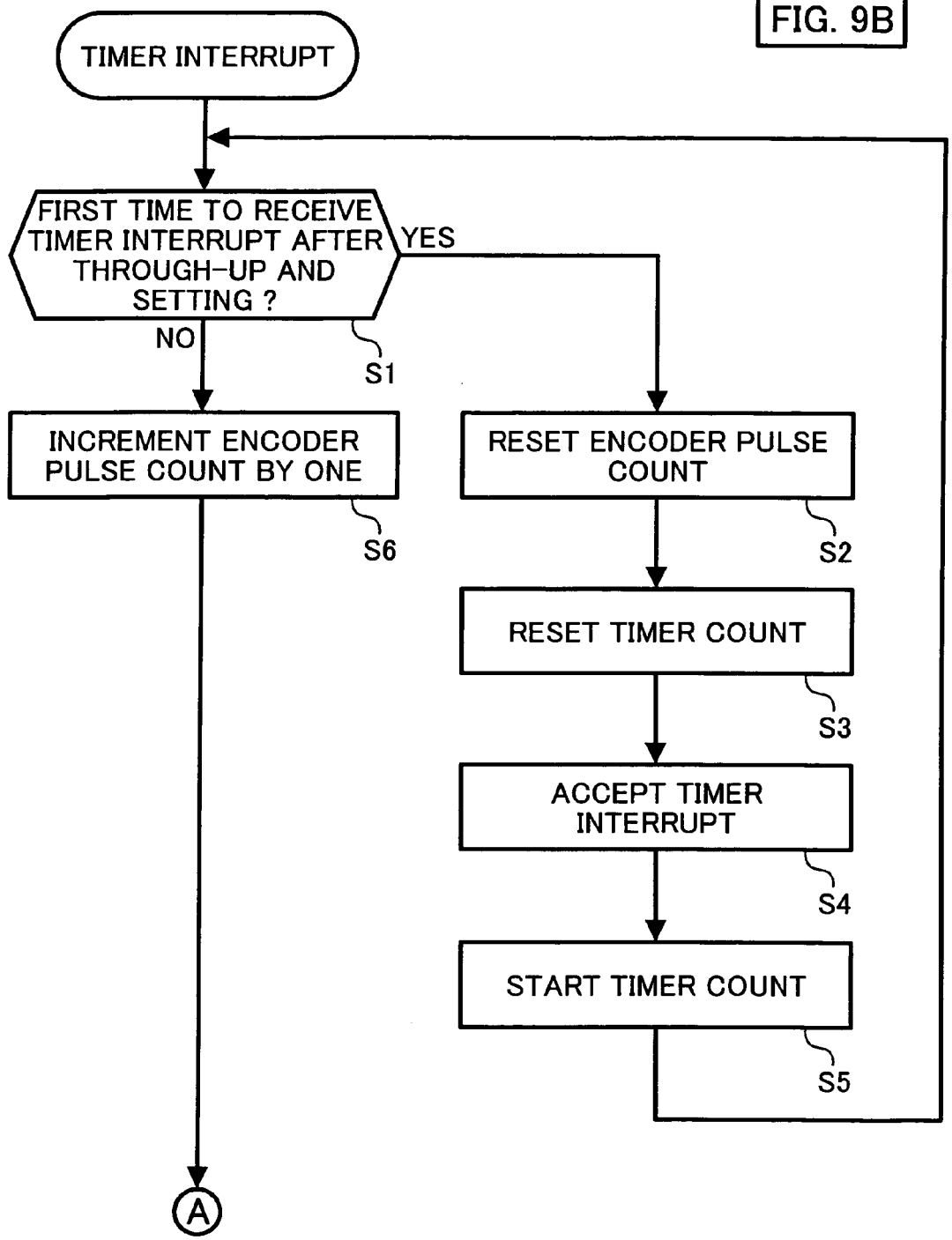
FIGS. 9A and 9B are flowcharts illustrating an exemplary operation of the motor drive controller of FIG. 4.
Figure 9B:
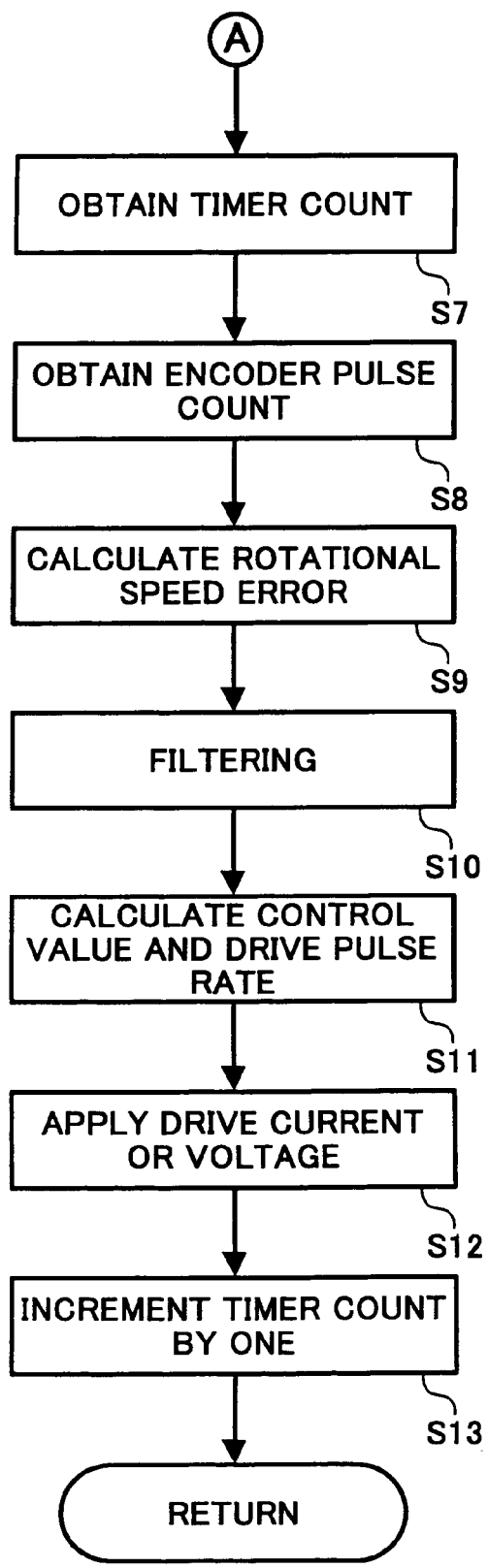

Referring now to FIGS. 8, 9A and 9B, an exemplary process of calculating a pulse rate f'(n) is explained. In this example, the processor 21 performs calculation at every sampling period, that is, every time it receives an interrupt from a timer (not shown) incorporated therein. In this example, the sampling period is previously set to 1 ms. Further, this process starts after completing through-up and settling operations of the drive motor 302, that is, after the drive motor 302 reaches a rotational speed substantially close to the target rotational speed.

As shown in FIG. 9A, as soon as the first calculator 101 detects a timer interrupt, Step S1 determines whether it is a first time to receive such timer interrupt If it is the first time, the process moves to Step S2 to reset an encoder pulse count to 0, and to Step S3 to reset a timer count to 0. This resetting process is also illustrated in FIG. 8, as "RESET".

Referring back to FIG. 9A, the first calculator 101 accepts the timer interrupt in Step S4, starts a timer count in Step S5 ("START TIMER" in FIG. 8), and returns to Step S1.

In Step S1, if it is not the first time to receive the timer interrupt, the process moves to Step S6 to increment an encoder pulse count by one. More specifically, as illustrated in FIG. 8, an encoder pulse count is incremented by one every time a rising edge of the encoder pulse signal is detected.

As shown in FIG. 9B, the first calculator 101 then obtains a timer count q in Step S7 ("OBTAIN q" in FIG. 8), and an encoder pulse count Ne in Step S8 ("OBTAIN Ne" in FIG. 8). Using these values, the first calculator 101 calculates a rotational speed error e(n) in Step S9, as follows:

e(n)[rad]=θ0*q−θ1*Ne, wherein θ0 denotes a step angle per timer count and θ1 denotes a step angle per encoder pulse count. As the above equation indicates, the rotational speed error e(n) is calculated based on the difference in angular displacement between the right roller 66 and the drive roller 63, in this example.

Further, the step angle θ0 can be obtained based on the target rotational speed of the transfer belt 60, and the core radius of the right roller 66. In this example, the right roller 66 has a radius of 15.5 mm, and the transfer belt 60 has a thickness of 0.1 mm. Thus, the right roller 66 has a core radius of about 15.55 mm. On the other hand, the step angle θ1 can be obtained based on the resolution of the encoder 301. In this example, the encoder 301 has a resolution of 200 pulses per revolution.

Next, in Step S10, the filter component 102 performs filtering on the calculated rotational speed error e(n). In this way, unwanted high-frequency signals are blocked so as to smoothen the rotation of the drive motor 302. As for the filter component 102, any type of low-pass filters may be used. For example, a butterworth IIR (infinite impulse response) low-pass filter of FIG. 10 may be preferably implemented with the following specifications:

Sampling rate: 1 kHz;

Passband ripple (Rp): 0.01 dB;

Stopband attenuation (Rs): 2 dB;

Passband edge frequency (Fp): 50 Hz; and

Stopband edge frequency (Fs): 100 Hz.

Figure 10:
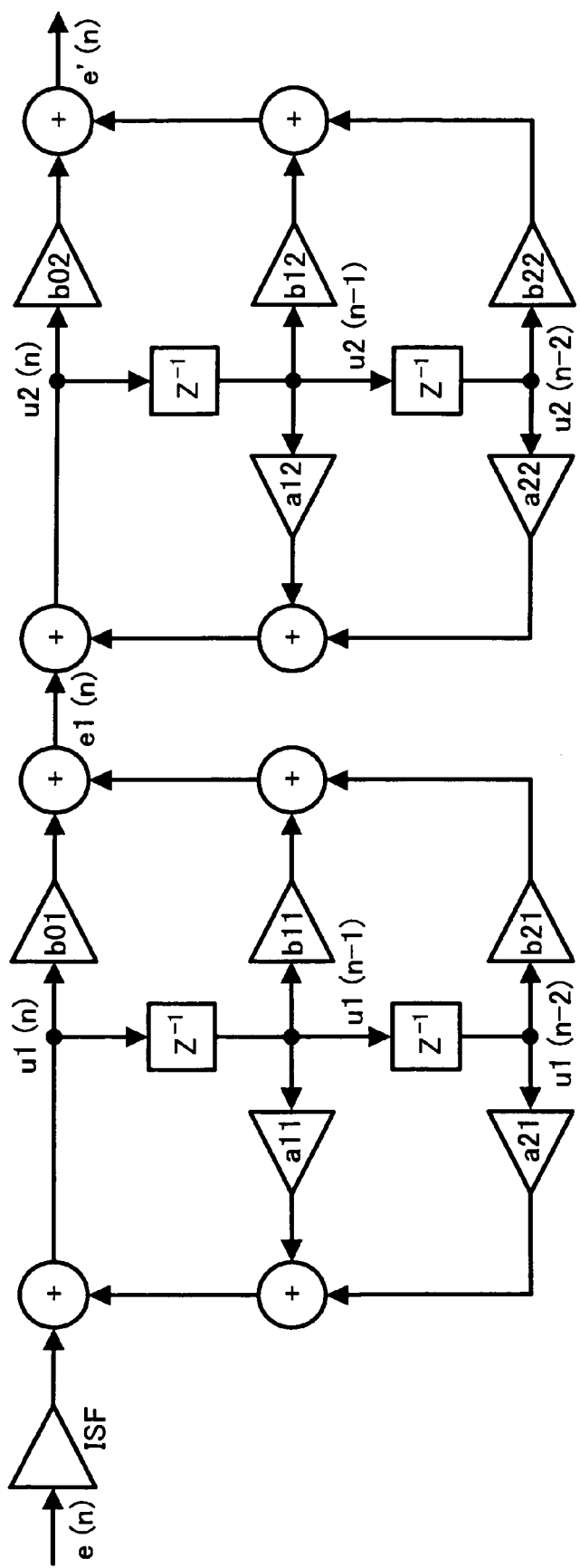
FIG. 10 is a block diagram illustrating an exemplary structure of a filter component of the motor drive controller of FIG. 4.
Figure 12:
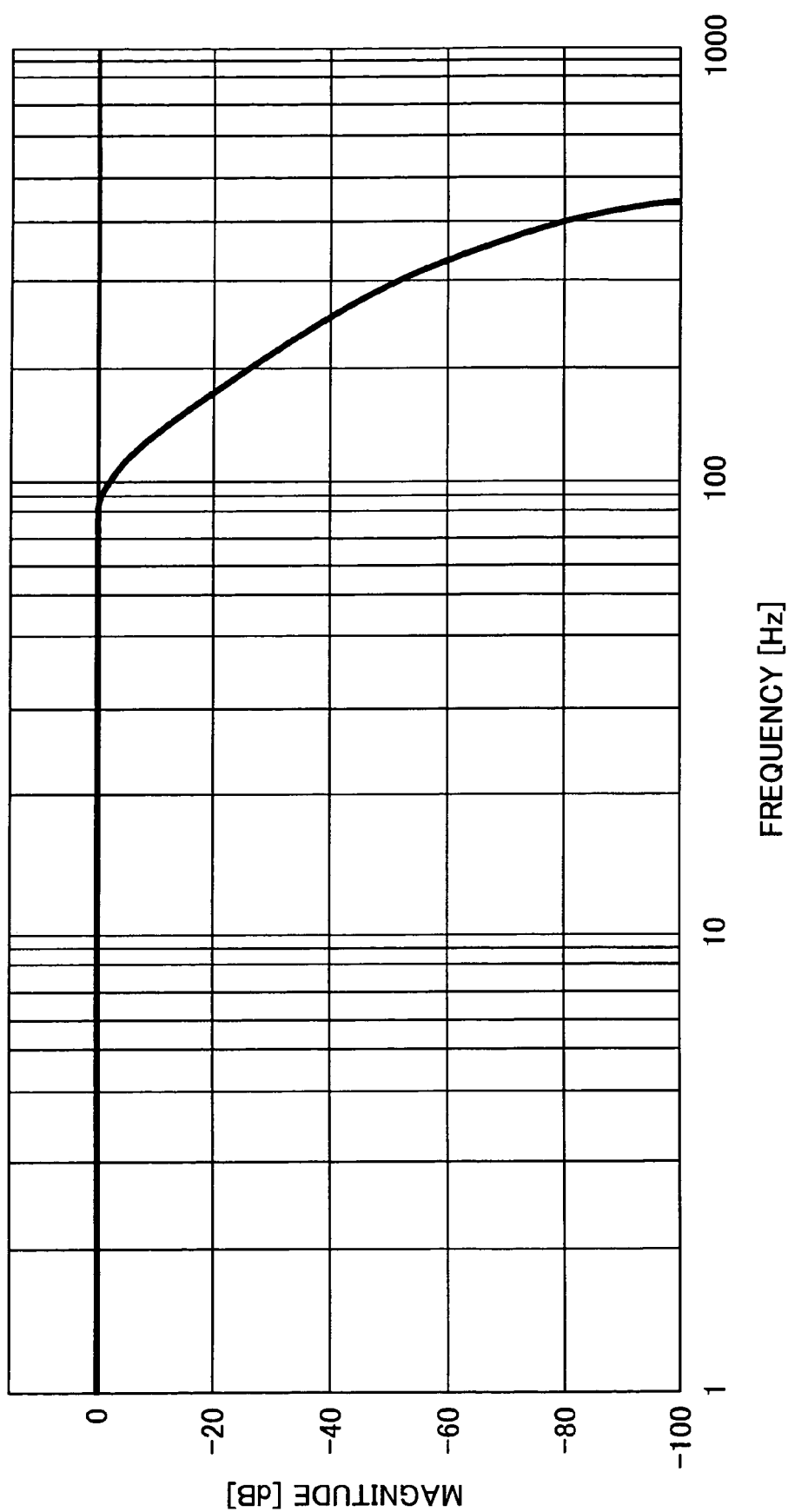
FIG. 12 is a graph showing the relationship between a frequency and a magnitude of the exemplary filter component of FIG. 10.
Figure 13:
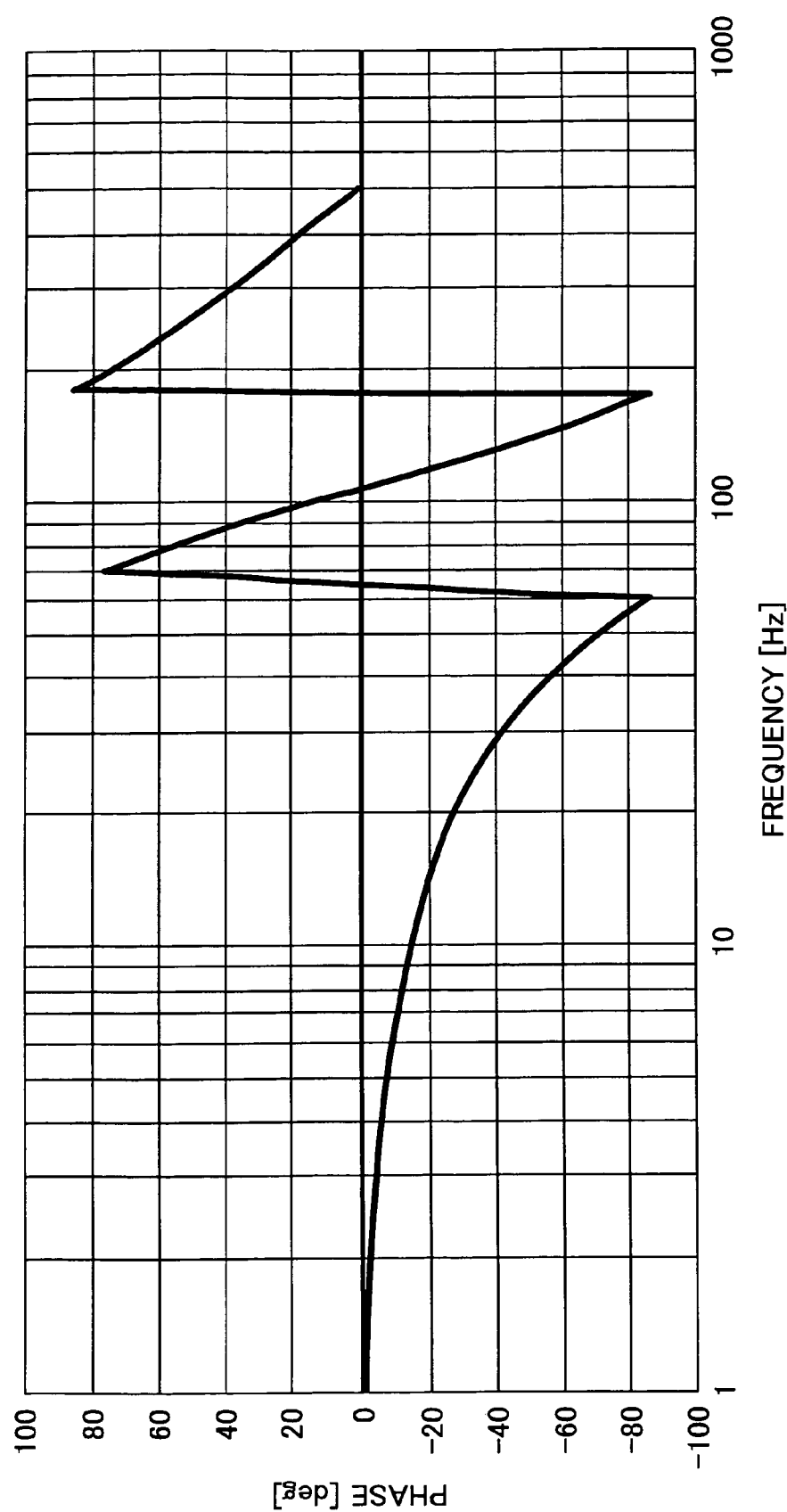
FIG. 13 is a graph showing the relationship between a frequency and a phase of the exemplary filter component of FIG. 10.

FIG. 11 lists coefficients used by the exemplary low-pass filter of FIG. 10. FIGS. 12 and 13 illustrate amplitude response and phase response of the exemplary low-pass filter of FIG. 10, respectively.

As shown in FIG. 10, this exemplary low-pass filter has a 2-cascade structure having nodes, u1(n), u1(n−1), u1(n−2), u2(n), u2(n−1), and u2(n−2). Herein, n, n−1, and n−2 correspond to a sample obtained at a current sampling period, a sample obtained at one period before the current sampling period, and a sample obtained at two periods before the current sampling period, respectively.

The filter component 102 calculates the controlled rotational speed error e'(n), using the following equations, every time it receives the rotational speed error e(n):

$$u1(n)=a11*u1(n-1)+a21*u1(n-2)+e(n)*ISF;$$

$$e1(n)=b01*u1(n)+b11*u1(n-1)+b21*u1(n-2);$$

$$u2(n)=a12*u2(n-1)+a22*u2(n-2)+e1(n); \text{ and}$$

$$e'(n)=b02*u2(n)+b12*u2(n-1)+b22*u2(n-2), \text{ wherein}$$

$$u1(n-2)=u1(n-1);$$

$$u1(n-1)=u1(n);$$

$$u2(n-2)=u2(n-1); \text{ and}$$

$$u2(n-1)=u2(n).$$

Next, in Step S11 of FIG. 9B, the gain component 103 calculates a control value f(n) using feedback control, such as proportional control, PI (proportional integral) control, PID (proportional integral differential) control, and H (Hardy space) infinity control. To simplify the calculation, a time-domain function is transformed to a frequency domain, using Laplace transform. Thus, the control value F(S) can be calculated by using the following equation:

F(S)=G(S)*E'(S), wherein G(S) denotes a transfer function, which corresponds to the gain component 103, in this example.

In one example, if PID control is employed, the control value F(S) can be expressed as follows:

F(S)=Kp*E'(S)+Ki*E'(S)/S+Kd*S*E'(S), wherein Kp, Ki, and Kd denote proportional gain, integral gain, and differential gain, respectively. Thus, the control value G(S) can be calculated using the following Equation 1:

$$G(S)=Kp+Ki/S+Kd*S \qquad \text{[Equation 1]}$$

To further simplify the calculation, the Equation 1 is Z-transformed, using $S=2T^*(1-Z^{-1})/(1+Z^{-1})$, to obtain the equation 2:

$$G(Z)=(b0+b1^*Z^{-1}+b2^*Z^{-2})/(1-a1^*Z^{-1}-a2^*Z^{-2}),$$
wherein: [Equation 2]

Figure 14:
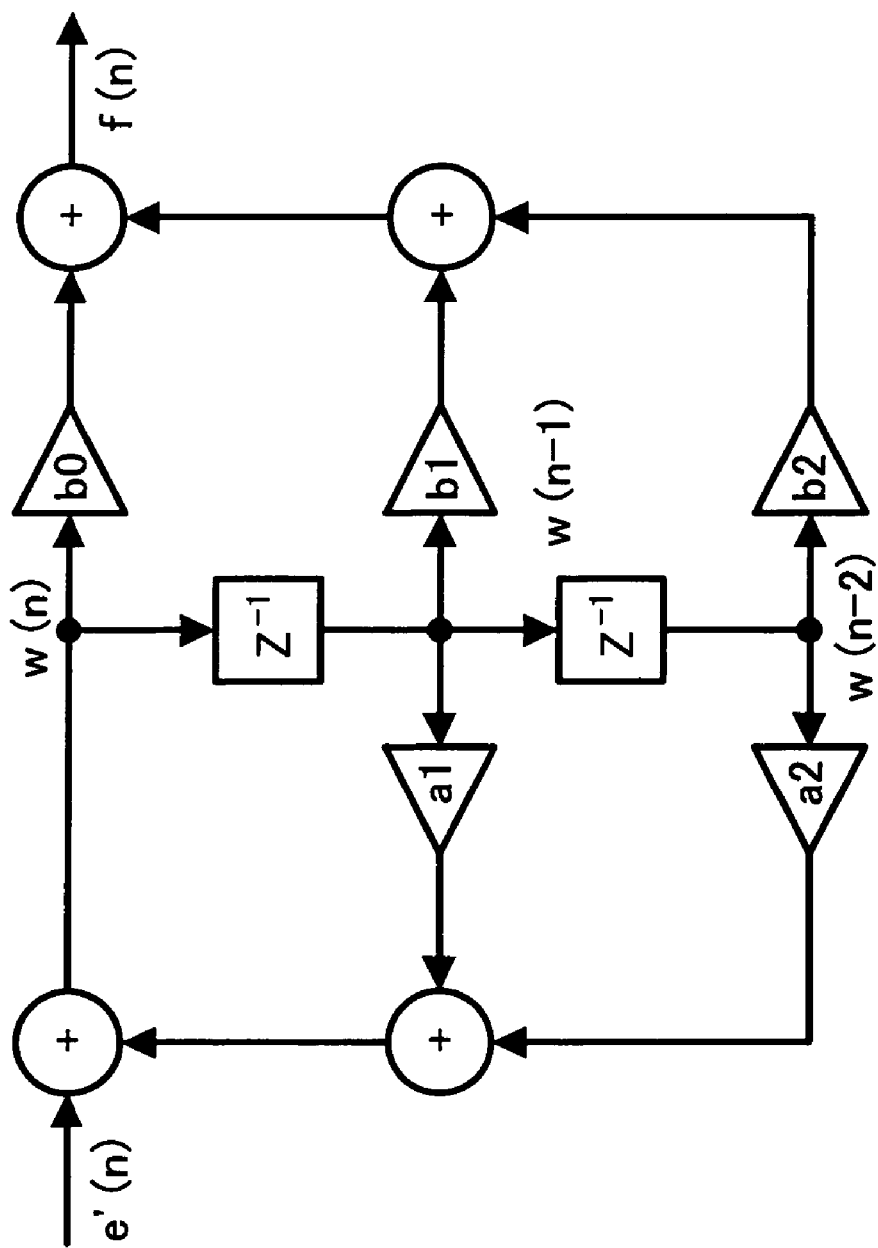
FIG. 14 is a block diagram illustrating an exemplary structure of a gain component of the motor drive controller of FIG. 4.

$a1=0;$ $a2=1;$ $b0=Kp+T^*Ki/2+2^*Kd/T;$ $b1=T^*Ki-4^*Kd/T;$ and $b2=-Kp+T^*Ki/2+2^*Kd/T.$ FIG. 14 is a block diagram illustrating the above-described calculation performed based on the Equation 2. As shown, the controlled rotational speed error e'(n) of discrete data is input to obtain the control value f(n) of discrete data. The gain component 103 has three nodes, w(n), w(n−1), and w(n−2), wherein n, n−1, and n−2 correspond to a sample obtained at a current sampling period, a sample obtained at one period before the current sampling period, and a sample obtained at two periods before the current sampling period, respectively.

The gain component 103 calculates the control value f(n), using the following equations 3 and 4, for each received controlled rotational speed error e'(n):

$$w(n)=a1^* w(n-1)+a2w(n-2)+e'(n)=w(n-2)+e'(n);\text{ and}\quad\text{[Equation 3]}$$

$$f(n)=b0^*w(n)+b1^*w(n-1)+b2^*w(n-2).\quad\text{[Equation 4]}$$

In one example, if the differential and integral gains Kd and Ki are both 0, the above equation 4 can be simplified as the following equation, since $b0=Kp$; $b1=0$; and $b2=-Kp$:

$$f(n)=Kp^*w(n)-Kp^*w(n-2)$$

Since $e'(n)=w(n)-w(n-2)$ can be obtained from the equation 3, the above equation can be further simplified as the Equation 5:

$$f(n)=Kp^*e'(n).\quad\text{[Equation 5]}$$

Subsequently, the second calculator 104 calculates a pulse rate f'(n), by adding the control value f(n) to the standard pulse rate f0(n), as the following equation 6:

$$f'(n)=f(n)+f0(n)=Kp^*e'(n)+f0(n).\quad\text{[Equation 6]}$$

In this case, the pulse rate f'(n) may be calculated in terms of frequency [Hz] or the number of pulses per second [pps].

If the standard pulse rate f0(n) is previously set to 6117 Hz, the pulse rate f'(n) can be expressed as follows:

$$f'(n)=Kp^*e'(n)+6117.$$

As soon as the pulse rate f'(n) is calculated in Step S11, the motor driver 26 applies a drive current or voltage according to the calculated pulse rate f'(n) in Step S12. At the same time, the pulse rate f'(n) is stored in the second memory 23.

In Step S13, the timer count is incremented by one, as illustrated in FIG. 8 as "INCREMENT". In other words, the calculation process described in Steps S9 to S11 is completed within one sampling period, which is 1 ms in this example. After the timer count increment in Step S13, the whole process described in Steps S1 and S13 is repeated so as to feedback control the rotational speed of the transfer belt 60.

Figure 15:
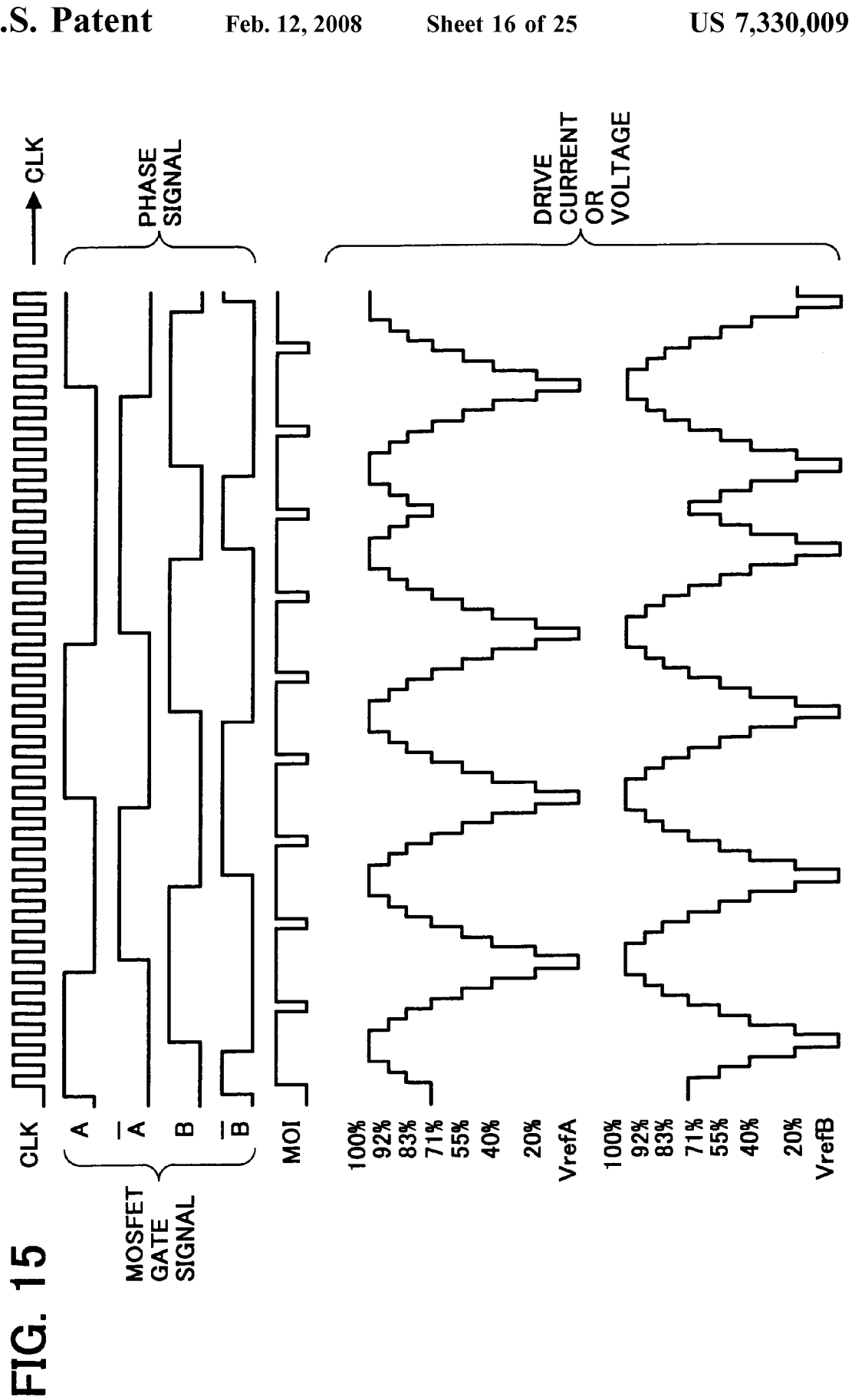
FIG. 15 is a timing chart illustrating a number of stepped currents or voltages when the image forming apparatus of FIG. 1 operates in a 2W1-2 phase excitation drive mode.

Now, consider an exemplary case where the drive motor 302 operates in two different excitation modes, including a 2W1-2 phase excitation drive mode (hereinafter, referred to as a "2W1-2 mode") and a 4W1-2 phase excitation drive mode (hereinafter, referred to as a "4W1-2 mode"). More specifically, the drive motor 302 operates in the 2W1-2 mode when the image forming apparatus 100 is set to form an image in a low recording resolution mode, such as in 600 dpi, as shown in FIG. 15. On the other hand, the drive motor 302 operates in the 4W1-2 mode when the image forming apparatus 100 is set to form an image in a high recording resolution mode, such as in 1200 dpi, as shown in FIG. 16.

Figure 16:
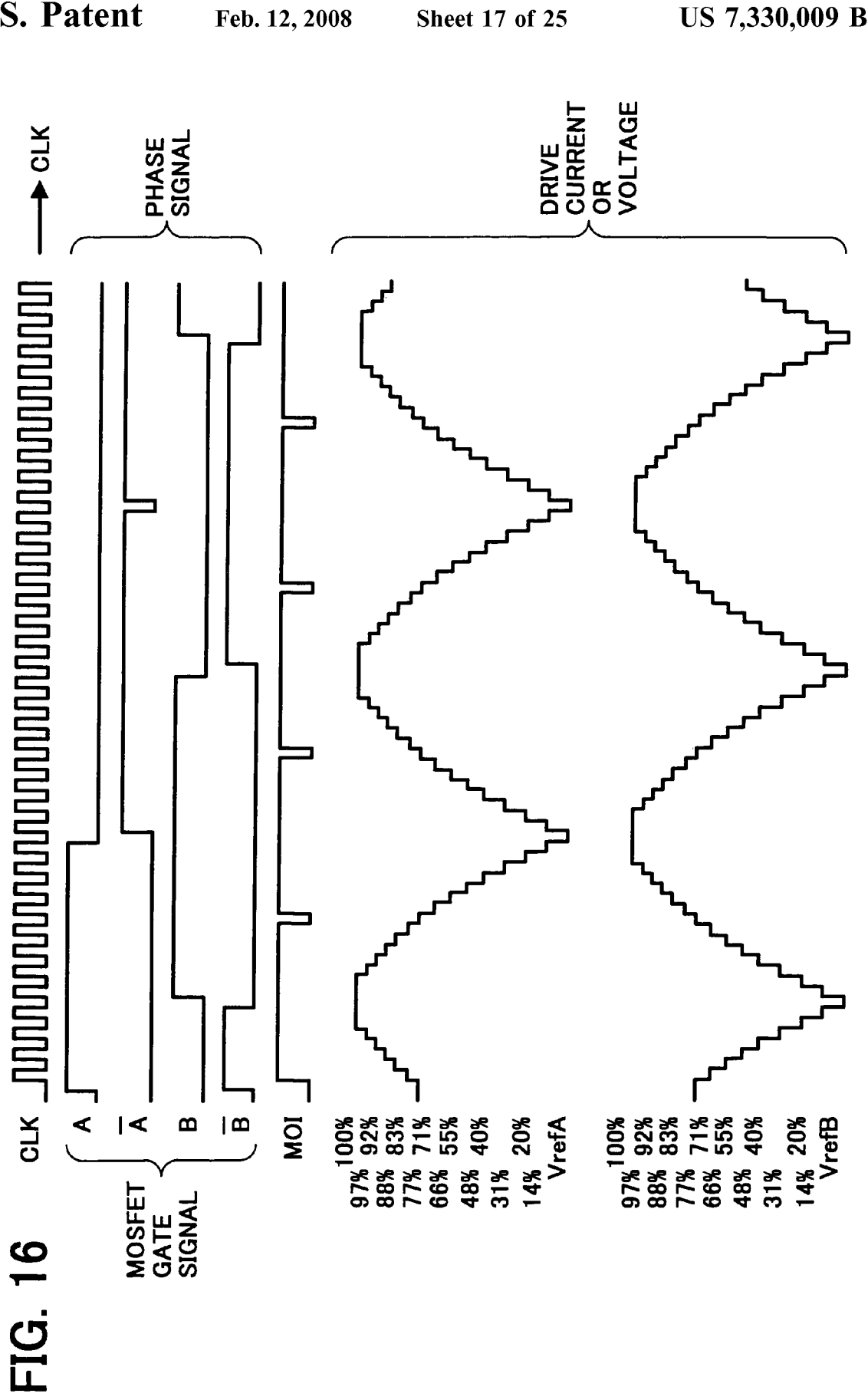
FIG. 16 is a timing chart illustrating a number of stepped currents or voltages when the image forming apparatus of FIG. 1 operates in a 4W1-2 phase excitation drive mode.

As FIGS. 15 and 16 indicate, while the same pulse rate f'(n) is applied to the both cases of the 2W1-2 and 4W1-2 modes, the rotational speed of the drive motor 302, which is proportional to the number of microsteps, is doubled in the 2W1-2 mode when compared to the 4W1-2 mode. This relationship between the 2W1-2 mode and the 4W1-2 mode can be expressed as follows, using the Equation 6:

$$2W1\text{-}2\text{ mode: }f'(n)=(Kp^*e'(n)+f0)^*2;\text{ and}$$

$$4W1\text{-}2\text{ mode: }f'(n)=Kp^*e'(n)+f0.$$

Figure 17:
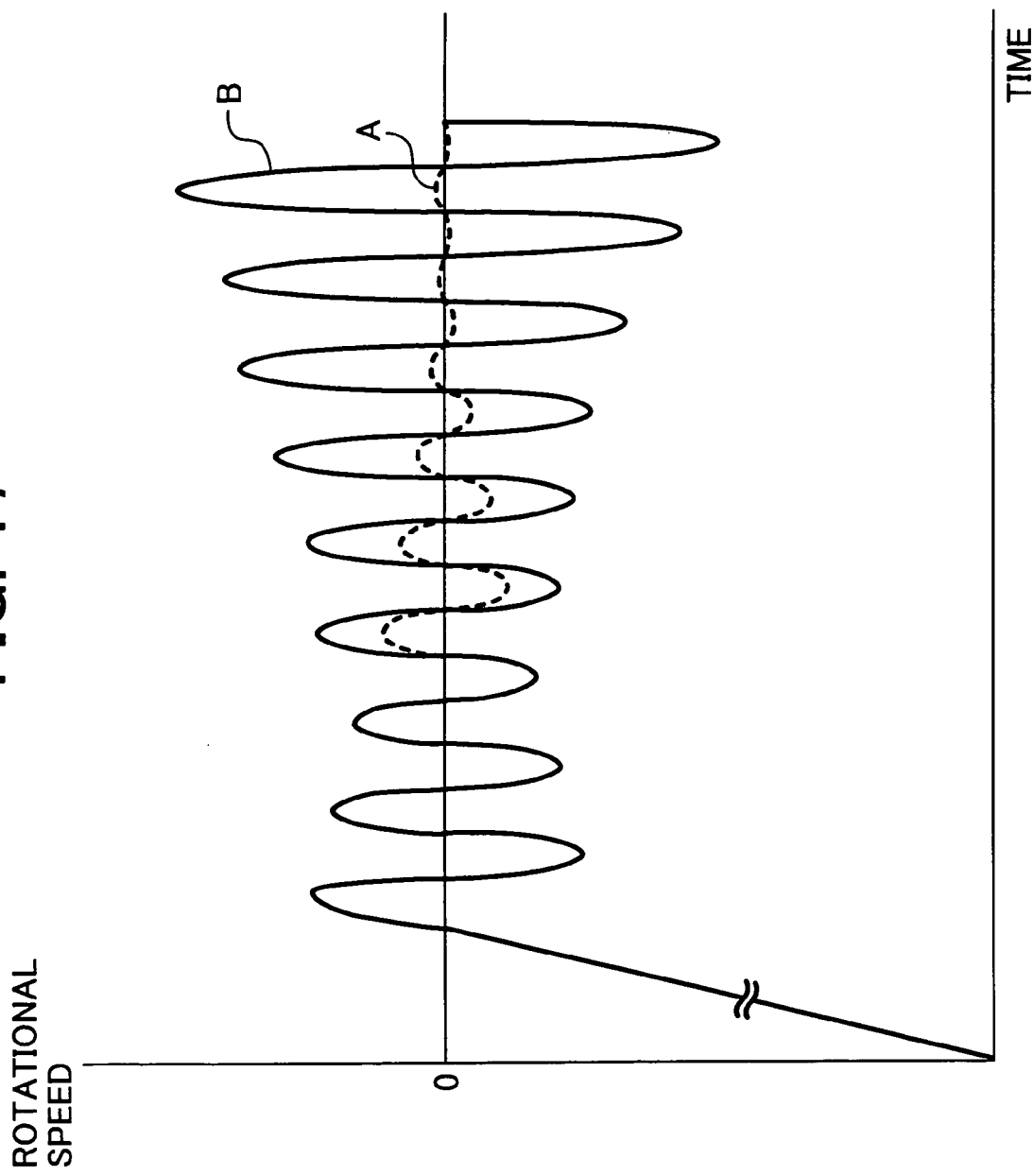
FIG. 17 is a graph showing the relationship between time and a rotational speed of a transfer belt with or without implementing the present invention.

Since the proportional gain Kp and the rotational speed error e'(n) are both doubled in the 2W1-2 mode, the rotational speed of the transfer belt 60 largely fluctuates around the target rotational speed 0, as illustrated in B of FIG. 17.

To prevent fluctuation, the processor 21 multiplies the proportional gain Kp by a predetermined constant in the 2W1-2 mode. In this example, the constant is proportional to the number of microsteps defined by a specific excitation mode, and can suppress the increase in proportional gain Kp, which causes oscillation of the rotation of the drive motor 302, i.e., speed fluctuation of the transfer belt 60.

For example, if the drive motor 302 operates in the 4W1-2 mode with a proportional gain Kp of 1000, a pulse rate f'(n) can be expressed as:

$$f'(n)=1000^*e(n)+f0(n).$$

If the drive motor 302 switches its mode to 2W1-2, the processor 21 multiplies a proportional gain Kp by ½. In this case, the proportional gain Kp is 2000. Therefore, a pulse rate f'(n) can be expressed as:

$$f'(n)=\tfrac{1}{2}^*2000^*e(n)+f0(n).$$

Thus, the drive motor 302 can always drive the transfer belt 60 around the target rotational speed 0 without causing speed fluctuation, even when an excitation mode is switched, as illustrated in A of FIG. 17.

Figure 18:
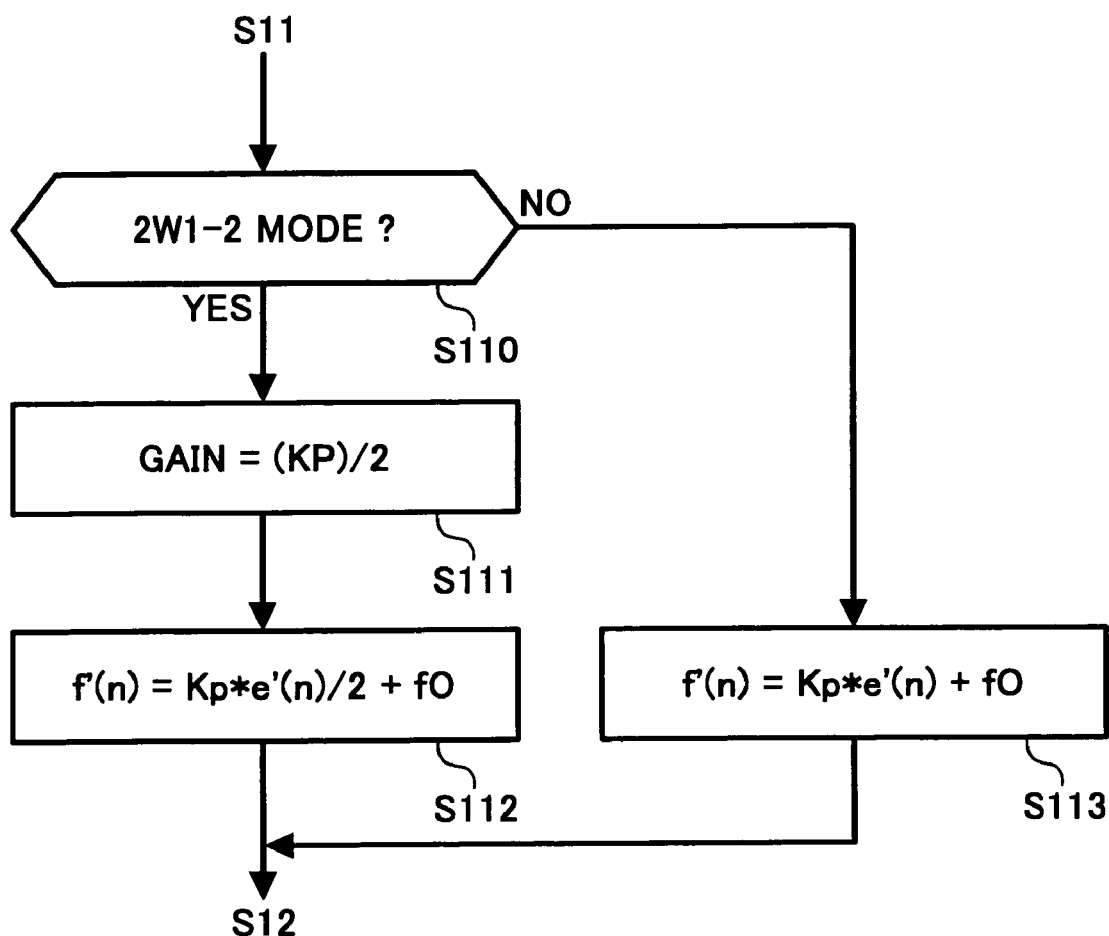
FIG. 18 is a flowchart illustrating a process of controlling a gain coefficient performed by the motor drive controller of FIG. 4.

FIG. 18 illustrates this exemplary process of controlling a proportional gain Kp according to an excitation mode.

After Step S11 of FIG. 9B, in Step S110 (FIG. 18), the processor 21 determines whether the drive motor 302 operates in the 2W1-2 mode. Alternatively, the processor 21 may determine whether the drive motor 302 operates in the low recording resolution mode, such as 600 dpi, if the 2W1-2 mode is automatically selected for the low recording resolution mode. If it is determined that the 2W1-2 mode is selected, the process moves to step S111 to automatically multiplies a proportional gain Kp by ½, and to step S112 to calculate a pulse rate f'(n). If it is not determined that the 2W1-2 mode is not selected in Step S110, i.e., the 4W1-2 mode is selected, the process moves to step S113 to calculate a pulse rate f'(n) without multiplying a proportional gain Kp by any constant.

Although the above-described example illustrates the case when microstep drive is applied, the proportional gain Kp can be controlled in a similar manner when a full or a half step drive is applied. For example, if the drive motor 302 switches to W1-2 phase excitation mode, the processor 21 multiplies a proportional gain Kp by ¼. In this case, the proportional gain Kp is 4000. Thus, a pulse rate f'(n) can be obtained as:

$$f'(n)=¼*4000*e(n)+f0(n).$$

Further, the excitation mode or the resolution mode may be automatically set according to the program stored in the first memory 22, or manually set via the operational panel, for example.

Figure 19:
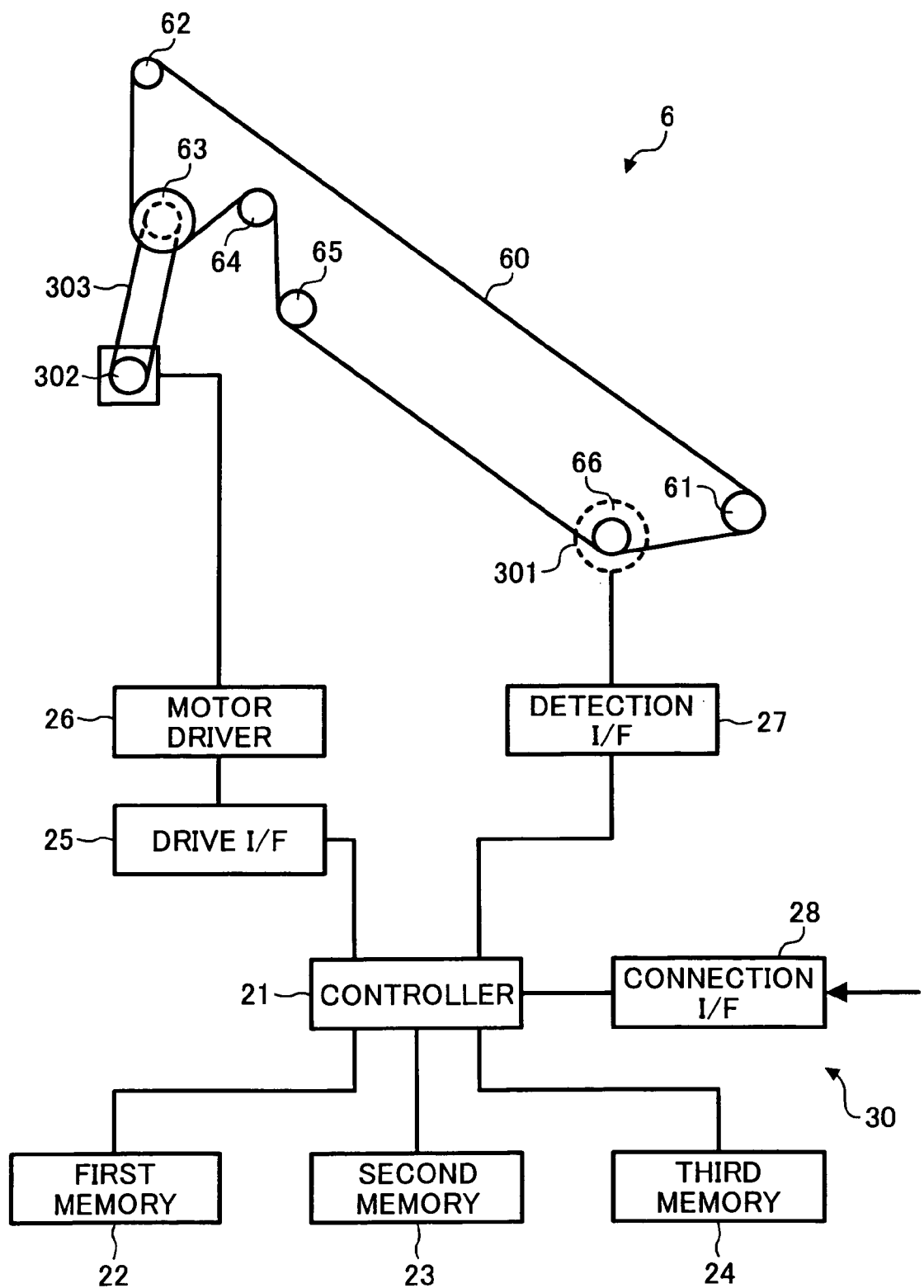
FIG. 19 is a block diagram illustrating an exemplary structure of a motor drive controller according to another preferred embodiment of the present invention.

Referring now to FIG. 19, a motor drive controller 30 according to another embodiment of the present invention is explained. The motor drive controller 30 is similar in structure to the motor drive controller 20 of FIG. 4, except for the addition of a third memory 24 and a connection interface 28. The third memory 24 of FIG. 19 includes an EEPROM (Electrically Erasable Programmable Read-Only Memory), however any kind of non-volatile memory may be used. The third memory 24 stores therein various kinds of data, including a reference control value Ref(n) to be used by the processor 21. The connection interface 28 serves as an interface between the processor 21 and other external devices, such as a computer. In this example, a serial interface, such as RS232C, is used.

The motor drive controller 30 can be incorporated in the transfer sheet device 6 of the image forming apparatus 100, in a similar manner as described above. In addition, it may be implemented in many other ways, as will be apparent to those skilled in the art.

For simplicity, an exemplary case where the motor drive controller 30 is implemented in the transfer sheet device 6 of the image forming apparatus 100 is described below.

The motor drive controller 30 operates in a substantially similar manner as the motor drive controller 20 operates. Specifically, the drive motor 302 drives the transfer belt 60 according to a drive current or voltage applied by the motor driver 26. The encoder 301 detects a rotational speed of the transfer belt 60 through an encoder pulse signal. The processor 21 calculates a pulse rate of a drive pulse signal, based on the encoder pulse signal. The drive interface 25 generates the drive pulse rate, and the motor driver 26 generates a drive current or voltage based on the drive pulse rate. With the drive current or voltage applied, the drive motor 302 makes a stepwise rotation. In this way, the rotational speed of the transfer belt 60 can be maintained around a target rotational speed.

Figure 20:
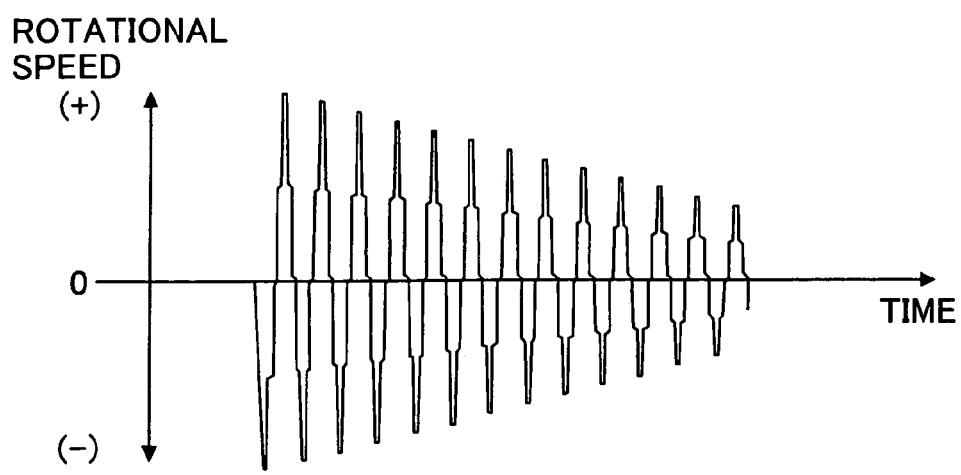
FIG. 20 is another graph illustrating the relationship between time and a rotational speed of a transfer belt in a background image forming apparatus.
Figure 21:
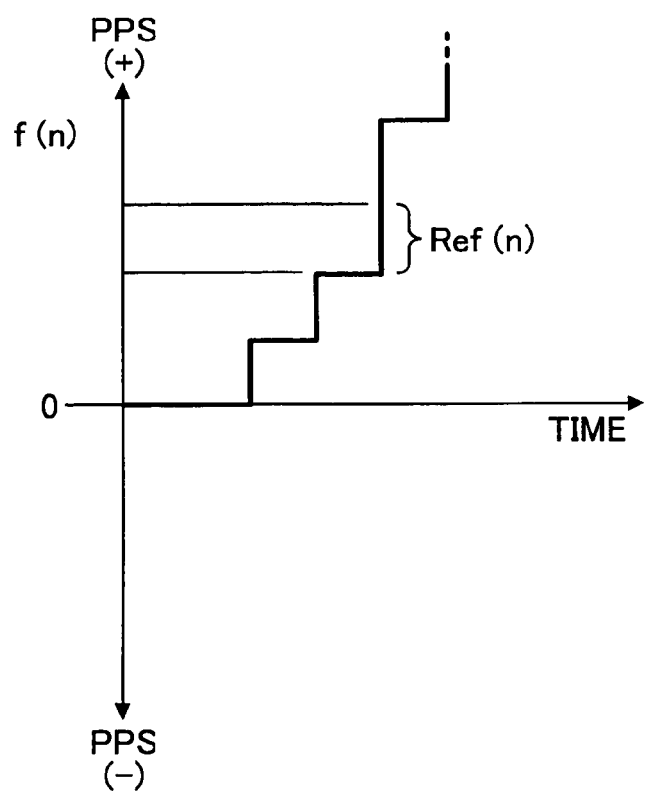
FIG. 21 is a graph illustrating the relationship between time and a control value, applied to a conventional image forming apparatus, without using a rotation speed controller.

However, as shown in FIG. 20, the rotational speed of the transfer belt 60 tends to fluctuate around the target rotational speed 0 when a drive current or voltage applied to the drive motor 302 is instantaneously changed due to a large control value. For example, as illustrated in FIG. 21, the rotational speed of the transfer belt 60 largely fluctuates when a control value f(n) exceeds the reference control value Ref(n). In this example, the reference control value Ref(n) corresponds to a maximum control value that can be applied to the drive motor 302 without causing oscillation of the drive motor 302, that is, without causing speed fluctuation of the transfer belt 60. The reference control value Ref(n) can be obtained through an external device, such as a computer connected to the connection interface 28. In one example, the external device arbitrarily sets a value of the reference control value Ref(n). Using the set reference control value Ref(n), a full-color toner image is obtained using the image forming apparatus 100, and is used if color displacement occurs. In this example, the value, which does not cause the color displacement, is preferably set as the reference control value Ref(n).

Figure 22:
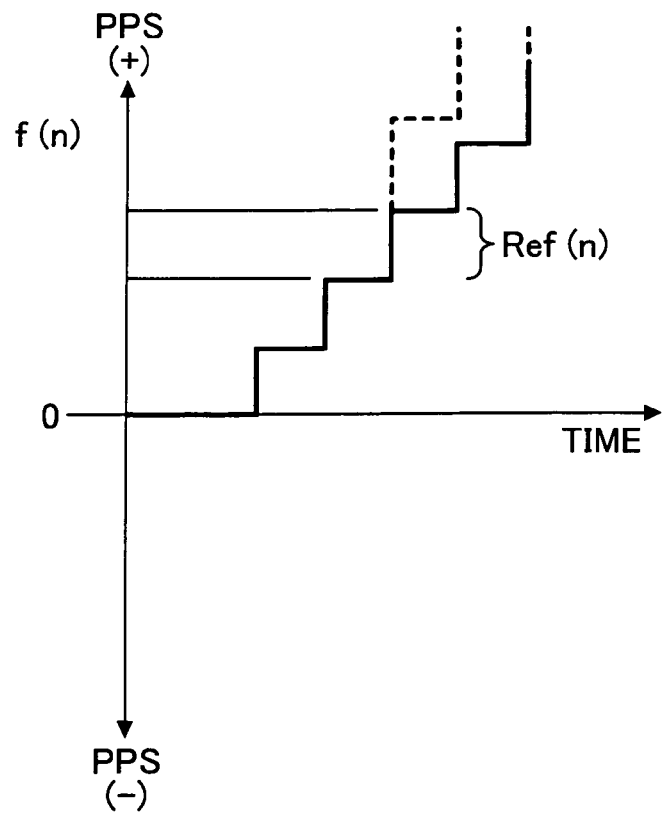
FIG. 22 is a graph illustrating the relationship between time and a control value, when the motor drive controller of FIG. 19 is implemented.
Figure 23:
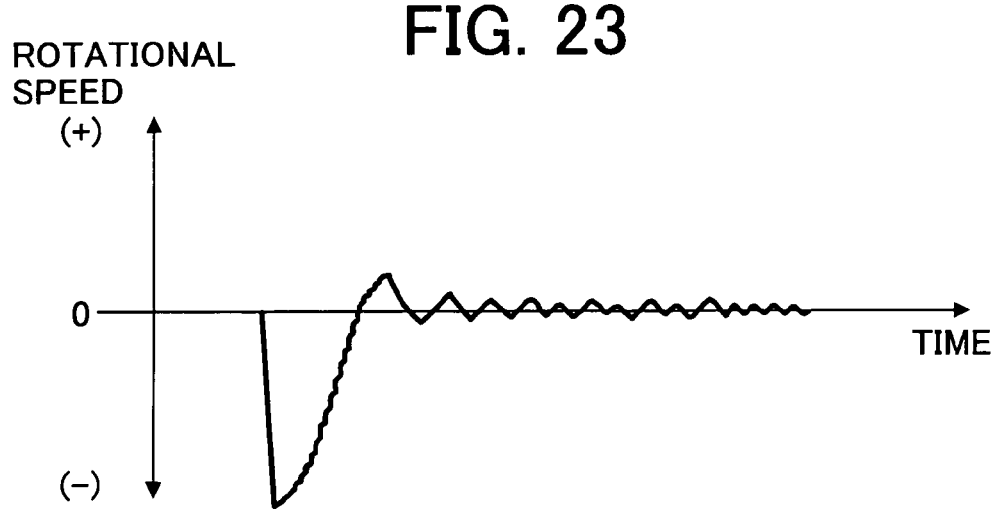
FIG. 23 is a graph illustrating the relationship between time and a rotational speed of a transfer belt, when the motor drive controller of FIG. 19 is implemented.

Thus, to prevent the drive motor 302 from oscillating, the motor drive controller 30 keeps the value of a control value f(n) within the reference control value Ref(n), as shown in FIG. 22. As a result, the drive motor 302 can drive the transfer belt 60 around the target speed 0 without generating oscillation, as illustrated in FIG. 23.

Figure 24:
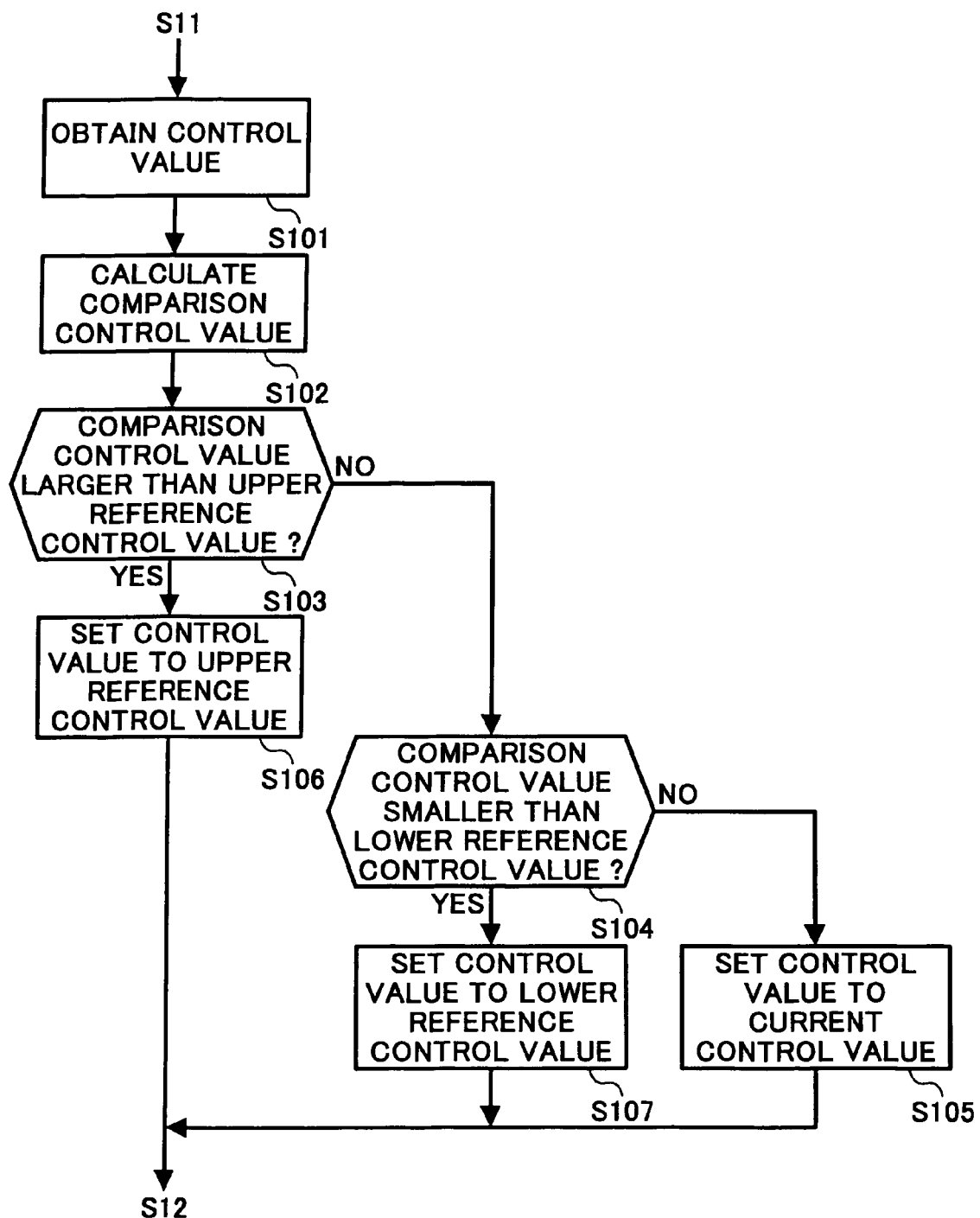
FIG. 24 is a flowchart illustrating an exemplary process of controlling a control value performed by the motor drive controller of FIG. 19.

FIG. 24 is a flowchart illustrating an exemplary process of controlling a control value f(n). In this example, the processor 21 performs this process at every sampling period, which is previously set to 1 ms.

After Step S11 of FIG. 9B, in Step S101, the processor 21 obtains a control value f(n).

In Step S102, the processor 21 generates a comparison control value fc(n). The comparison control value fc(n) can be calculated as a difference between a control value f(n) of a current sampling period and a control value f(n) of a previous sampling period. Alternatively, the comparison control value fc(n) may be calculated as a difference between a pulse rate f'(n) of the current sampling period and a pulse rate f'(n) of the previous sampling period.

In Step S103, the processor 21 determines whether the comparison control value fc(n) is larger than an upper reference control value Refp(n). The upper reference control value Refp(n) is determined by the reference control value Ref(n), and corresponds to a maximum control value that can be added to a pulse rate of the previous sampling period, without causing oscillation of the drive motor 302. The upper reference control value Refp(n) is previously stored in the third memory 24. If the comparison control value fc(n) is equal to or smaller than the upper reference control value Refp(n) ("No" in Step S103), the process moves to Step S104.

In Step S104, the processor 21 determines whether the comparison control value fc(n) is smaller than a lower reference control value Refm(n). The lower reference control value Refm(n) is determined by the reference control value Ref(n), and corresponds to a maximum control value that can be subtracted from a pulse rate of the previous sampling period, without causing oscillation of the drive motor 302. The lower reference control value Refm(n) is previously stored in the third memory 24. If the comparison control value fc(n) is equal to or larger than the lower reference control value Refm(n) ("No" in Step S104), the process moves to Step S105. In Step S105, the processor 21 sets the control value f(n) obtained in Step S102 as a control value f(n) at the current sampling period.

On the other hand, if Step S 103 determines that the comparison control value fc(n) is larger than the upper reference control value Refp(n) ("Yes" in Step S 103), the process moves to Step S106 to set the upper reference control value Refp(n) as a control value f(n) at the current sampling period.

If Step S104 determines that the comparison control value fc(n) is smaller than the lower reference control value Refm(n) ("Yes" in Step S104), the process moves to Step S107 to set the lower reference control value Refm(n) as a control value f(n) at the current sampling period.

In this way, the control value f(n) is controlled within the range of reference control value Ref(n), such that the drive motor 302 can drive the transfer belt 60 around the target rotational speed 0 with lesser or without generating oscillation, as illustrated in FIG. 23.

Figure 25A:
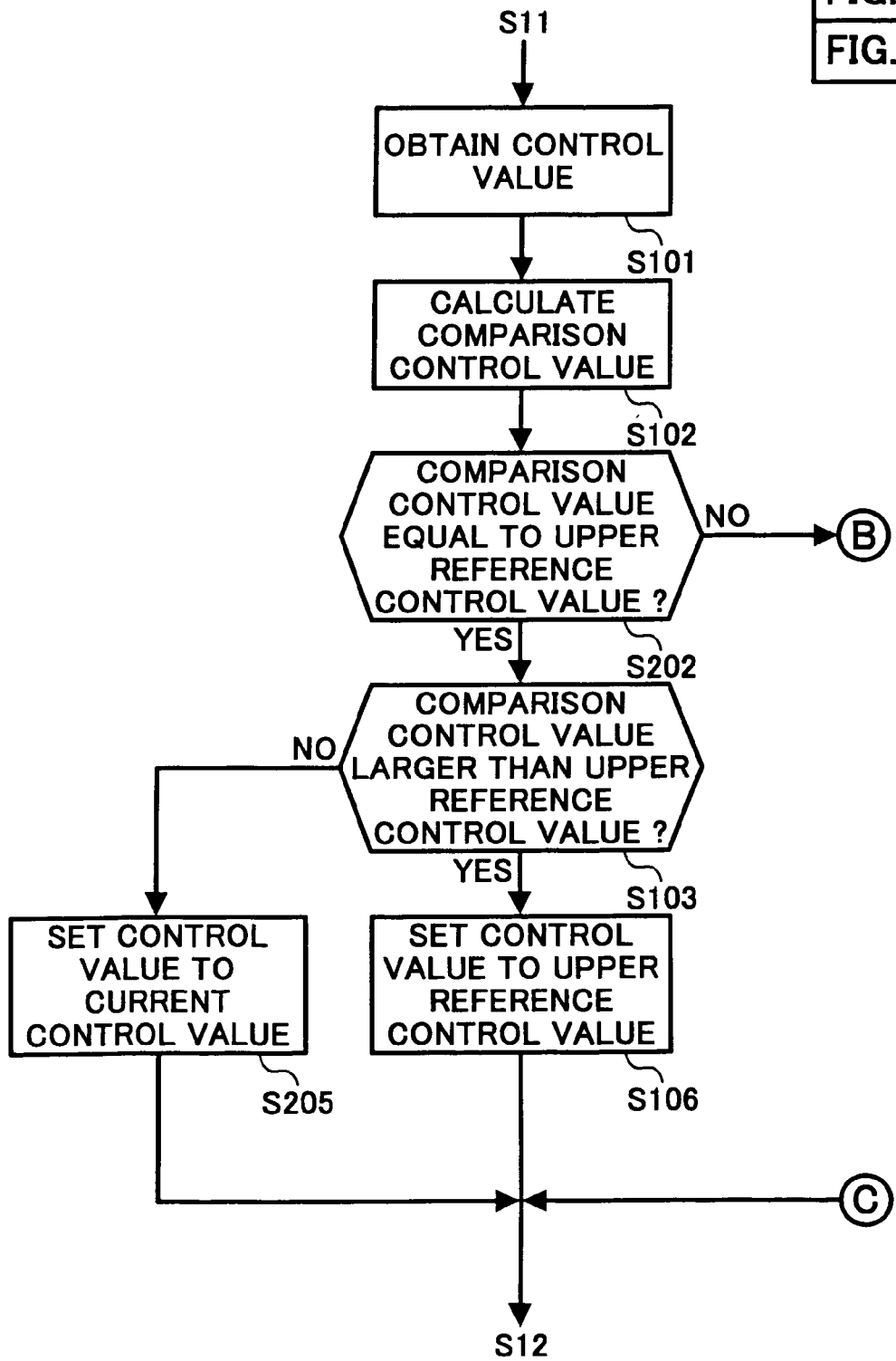
FIGS. 25A and 25B are flowcharts illustrating another exemplary process of controlling a control value performed by the motor drive controller of FIG. 19.

FIGS. 25A and B represent a flowchart illustrating another exemplary process of controlling a control value f(n). The flowcharts of FIGS. 25A and B are substantially similar to the flowchart of FIG. 24, except for the addition of Step S202 and Step S205. Again in this example, the processor 21 performs this process at every sampling period, which is previously set to 1 ms.

In Step S202, the processor 21 determines whether the comparison control value fc(n) is equal to the upper reference control value Refp(n). If the answer is no, the process moves to Step S104, and otherwise the process moves to Step S103.

In Step S103, the processor 21 determines whether the comparison control value fc(n) is larger than the upper reference control value Refp(n). If the answer is no, the process moves to Step S205 to set the control value f(n) obtained in Step S102 as a control value f(n) at the current sampling period. If the answer is yes, the process moves to Step S106.

In this way, the control value f(n) is controlled within the reference control value Ref(n), such that the drive motor 302 can drive the transfer belt 60 around the target rotational speed 0 with lesser or without generating oscillation, as illustrated in FIG. 23.

Figure 25B:
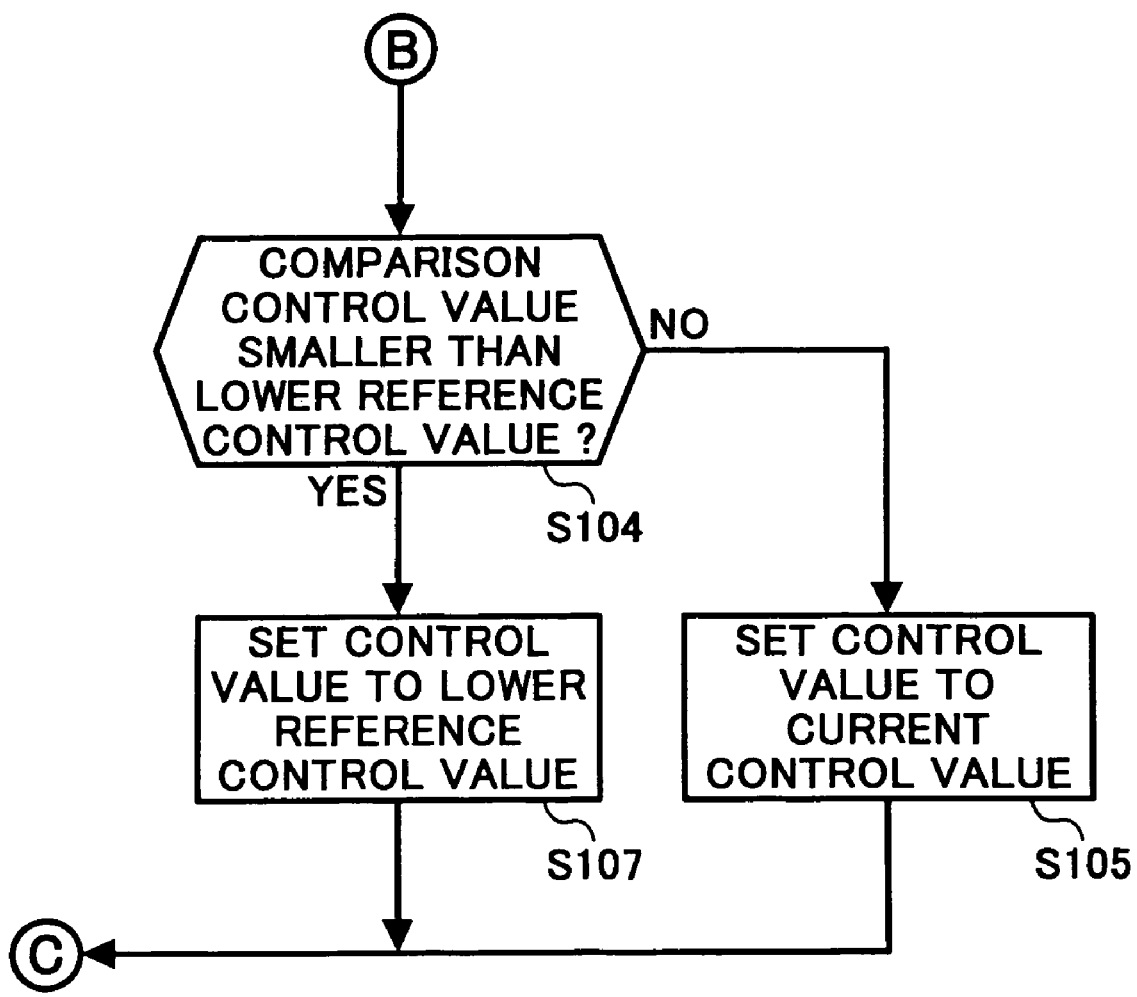

The above-described exemplary processes are provided for the illustrative purpose, such that a process for controlling a control value f(n) within the reference control value Ref(n) is not limited to these exemplary processes of FIGS. 24 and 25.

Further, a process for calculating a rotational speed error, a controlled rotational speed error, a control value, or a pulse rate, is not limited to the above-described exemplary processes.

Therefore, numerous additional modifications and variations are possible in light of the above teachings. It is to be understood that within the scope of the appended claims, the disclosure of this patent specification may be practiced otherwise than as specifically described herein.

In addition, elements and/or features of different illustrative embodiments may be combined with each other and/or substituted for each other within the scope of this disclosure and appended claims. For example, a control value may be kept within a predetermined value range by controlling a gain coefficient, by comparing a comparison control value with a reference control value, or by any other techniques, according to the scope and the spirit of the appended claims. These techniques may be combined, as will be apparent to those skilled in the art.

Further, this invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

What is claimed is:

1. A motor drive controller comprising:
    a drive motor configured to drive the moving body around a target moving speed;
    a detector configured to detect a current moving speed of the moving body and output the current moving speed as a detector pulse signal;
    a controller configured to receive the detector pulse signal from the detector, calculate a difference between the current moving speed and the target moving speed, calculate a control value using a gain and based on the difference, calculate a pulse rate of a drive pulse signal based on the control value after having adapted the control value to be within a predetermined value range, and control the drive motor moving speed with the pulse rate, the controller comprising:
    a first calculator configured to calculate a difference between the target moving speed and the current moving speed, which corresponds to a moving speed error based on the detector pulse signal,
    a filter component configured to generate a controlled moving speed error by removing a high frequency component of the moving speed error,
    a gain component configured to generate the control value by multiplying the controlled moving speed error with the gain,
    a second calculator configured to calculate the pulse rate by adding the control value to a predetermined standard pulse rate,
    a first memory configured to store a program for the controller,
    a second memory configured to store various variable data, including the moving speed error, the control value, and the pulse rate, and
    a third memory configured to store a predetermined reference control value;
    a detection interface configured to convert the detector pulse signal from analog to digital;
    a drive interface configured to generate the drive pulse signal based on the pulse rate; and
    a motor driver configured to generate the at least one of the stepped voltage or the stepped current based on the drive pulse signal and apply the drive current or voltage to the drive motor,
    wherein the drive motor is configured to be fed by at least one of a stepped voltage or a stepped current, and the gain is determined by a number of steps of the at least one of the stepped voltage or the stepped current,
    the drive motor includes a stepping motor and operates as a microstep excitation drive, and
    the controller generates a comparison control value, compares the comparison control value with the reference control value, and controls the control value to be within a range defined by the predetermined reference control value.

2. The motor drive controller of claim 1, wherein the comparison control value is calculated based on the control value read out from the second memory.

3. The motor drive controller of claim 1, wherein the comparison control value is calculated based on the pulse rate read out from the second memory.

4. The motor drive controller of claim 1, wherein the reference control value comprises an upper reference control value and a lower reference control value.

5. The motor drive controller of claim 4, wherein the upper reference control value corresponds to a maximum control value that can be added to the predetermined standard pulse rate, capable of sufficiently suppressing an oscillation of the drive motor moving speed and the lower reference control value corresponds to a maximum control value that can be subtracted from the predetermined standard pulse rate, capable of sufficiently suppressing oscillation of the drive motor moving speed.

6. The motor drive controller of claim 4,
    wherein the control value is set to a current control value that is calculated at a current sampling period when the comparison control value is equal to the upper reference control value or to the lower reference control value, or is between the upper reference control value and the lower reference control value, the control value is set to the upper reference control value when the comparison control value is larger than the upper reference control value, or the control value is set to the lower reference control value when the comparison control value is smaller than the lower reference control value.

* * * * *